(12) United States Patent
Jacobi et al.

(10) Patent No.: US 8,101,907 B2
(45) Date of Patent: Jan. 24, 2012

(54) METHODS FOR QUANTITATIVE LITHOLOGICAL AND MINERALOGICAL EVALUATION OF SUBSURFACE FORMATIONS

(75) Inventors: David J. Jacobi, Edmond, OK (US); John M. Longo, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 220 days.

(21) Appl. No.: 11/589,374

(22) Filed: Oct. 30, 2006

(65) Prior Publication Data

US 2007/0246649 A1      Oct. 25, 2007

Related U.S. Application Data

(60) Provisional application No. 60/793,477, filed on Apr. 19, 2006, provisional application No. 60/817,226, filed on Jun. 28, 2006.

(51) Int. Cl.
*G01V 5/08* (2006.01)
(52) U.S. Cl. ......................................................... 250/256
(58) Field of Classification Search ................... 250/256
See application file for complete search history.

(56) References Cited

U.S. PATENT DOCUMENTS

| | | | |
|---|---|---|---|
| 3,521,064 A | | 7/1970 | Moran et al. |
| 3,971,935 A | * | 7/1976 | Nelligan ........................ 250/262 |
| 3,976,878 A | * | 8/1976 | Chevalier et al. ............. 250/253 |
| 4,263,509 A | | 4/1981 | Fertl et al. |
| 4,317,993 A | | 3/1982 | Hertzog, Jr. et al. |
| 4,645,926 A | * | 2/1987 | Randall ........................ 250/256 |
| 4,646,240 A | * | 2/1987 | Serra et al. ...................... 702/11 |
| 4,712,424 A | | 12/1987 | Herron |
| 4,722,220 A | | 2/1988 | Herron |
| 4,773,264 A | | 9/1988 | Herron |
| 4,890,486 A | | 1/1990 | Herron |
| 4,903,527 A | | 2/1990 | Herron |
| 4,910,758 A | | 3/1990 | Herrick |
| 5,086,224 A | | 2/1992 | Roscoe et al. |
| 5,440,118 A | | 8/1995 | Roscoe |
| 5,471,057 A | | 11/1995 | Herron |

(Continued)

FOREIGN PATENT DOCUMENTS

RU    2 025 748 C1    12/1994

(Continued)

OTHER PUBLICATIONS

Doyen, P.M., et al., "Monte Carlo Simulation of Lithology From Seismic Data in a Channel-Sand Reservoir", SPE 19588, 1989, pp. 181-186.

(Continued)

*Primary Examiner* — David Porta
*Assistant Examiner* — Shun Lee
(74) *Attorney, Agent, or Firm* — Locke Lord LLP

(57) ABSTRACT

Methods, systems, apparatus and processes for determining the lithology as well as the mineralogy of subterranean formations surrounding a borehole are described. According to the methods and processes, well log data measurements from neutron spectroscopy applications and associated tool response parameters are solved using an artificial intelligence system, such as an expert system, which in turn generates an appropriate discriminator and/or compositional model that estimates both general and specific lithology as well as the mineralogy constraints of the subterranean formation being analyzed. The methods exhibit good elemental correlation between conventional methods of lithology and mineralogy determination, and can provide numerous output data, including grain density and porosity data within zones of the formation.

37 Claims, 18 Drawing Sheets

U.S. PATENT DOCUMENTS

| | | | |
|---|---|---|---|
| 5,786,595 | A | 7/1998 | Herron et al. |
| 6,044,327 | A | 3/2000 | Goldman |
| 6,140,816 | A | 10/2000 | Herron |
| 6,718,265 | B2 | 4/2004 | Herron et al. |
| 6,927,390 | B2 | 8/2005 | Mickael |
| 2006/0033022 | A1 | 2/2006 | Madigan et al. |
| 2006/0033023 | A1 | 2/2006 | Pemper et al. |

FOREIGN PATENT DOCUMENTS

| | | |
|---|---|---|
| RU | 2 149 428 C1 | 5/2000 |

OTHER PUBLICATIONS

Herron, M.M. and Herron, S.L., "Quantitative Lithology: Open and Cased Hole Application Derived From Integrated Core Chemistry and Mineralogy Database", in: Harvey, P.K. & Lovell, M.A. (eds), Core-Log Integration, 1998, pp. 81-95, vol. 136, Geological Society (London).

Goncalves, C.A. and Ewert, L, "Evaluation of the Geochemical Logging Data in Hole 959D: Cote D'Ivoire-Ghana Transform Margin", Proceedings of the Ocean Drilling Program, Scientific Results, vol. 159, 1998, pp. 171-179.

Wendlandt, R.F. and Bhuyan, K., "Estimation of Mineralogy and Lithology from Geochemical Log Measurements", The American Association of Petroleum Geologists Bulletin, vol. 74 (No. 6), 1990, pp. 837-856.

Harvey, P.K., et al., "The Estimation of Modal Mineralogy: A Problem of Accuracy in Core-Log Calibration", in: Harvey, P.K. & Lovell, M.A. (eds), Core-Log Integration, 1998, pp. 25-38, vol. 136, Geological Society (London).

Harvey, P.K., et al., "Mineralogy Logs: Element to Mineral Transforms and Compositional Colinearity in Sediments", SPWLA 33rd Annual Logging Symposium, 1992, pp. 1-18.

Chakrabarty, T. and Longo, J.M., "A New Method for Mineral Quantification to Aid in Hydrocarbon Exploration and Exploitation", Journal of Canadian Petroleum Technology, vol. 36 (No. 11), 1997, pp. 15-21.

Ouenes, A., "Practical Application of Fuzzy Logic and Neural Networks to Fractured Reservoir Characterization", Computers & Geosciences, vol. 26, 2000, pp. 953-962.

Paktunc, A.D., "MODAN: An Interactive Computer Program for Estimating Mineral Quantities Based on Bulk Composition", Computers & Geosciences, vol. 24 (No. 5), 1998, pp. 425-431.

Cohen, D. and Ward, C.R., "SEDNORM—A Program to Calculate a Normative Mineralogy for Sedimentary Rocks Based on Chemical Analyses", Computers & Geosciences, vol. 17 (No. 9), 1991, pp. 1235-1253.

Caritat, P., et al., "LPNORM: A Linear Programming Normative Analysis Code", Computers & Geosciences, vol. 20 (No. 3), 1994, pp. 313-347.

Doyen, P.M., Guidish, TM., and De Buyl, M.H., "Monte Carlo Simulation of Lithology From Seismic Data in a Channel-Sand Reservoir", SPE Paper No. 19588, pp. 181-186; Oct. 1989.

Herron, M.M. and Herron, S.L., "Quantitative Lithology: Open and Cased Hole Application Derived From Integrated Core Chemistry and Mineralogy Database", in: Harvey, ,P.K. & Lovell, M.A. (eds), Core-Log Integration, vol. 136, pp. 81-95, Geological Society (London): 1998.

Goncalves, C.A. and Ewert, L., "Evaluation of the Geochemical Logging Data in Hole 959D: Cote D'Ivoire-Ghana Transform Margin", Proceedings of the Ocean Drilling Program, Scientific Results, vol. 159, pp. 171-179; Dec. 1998.

Wendlandt, R.F. and Bhuyan, K., "Estimation of Mineralogy and Lithology from Geochemical Log Measurements", The American Association of Petroleum Geologists Bulletin, vol. 74 (No. 6), pp. 837-856; Jun. 1990.

Harvey, P.K., Brewer, T.S., Lovell, M.A., and Kerr, S.A., "The Estimation of Modal Mineralogy: A Problem of Accuracy in Core-Log Calibration", in: Harvey, P.K. & Lovell, M.A. (eds), Core-Log Integration, vol. 136, pp. 25-38, Geological Society (London); 1998.

Harvey, P.K., Lofts, J.C., and Lovell, M.A., "Mineralogy Logs: Element to Mineral Transforms and Compositional Colinearity in Sediments", SPWLA 33rd Annual Logging Symposium, pp. 1-18; Jun. 1992.

Chakrabarty, T. and Longo, J.M., "A New Method for Mineral Quantification to Aid in Hydrocarbon Exploration and Exploitation", Journal of Canadian Petroleum Technology, vol. 36 (No. 11), pp. 15-21; Dec. 1997.

Pemper, R., Sommer, A., Guo, P., Jacobi, D., Longo, J., Bliven, S., Rodriguez, E., Mendez, F., and Han, X., "A New Pulsed Neutron Sonde for Derivation of Formation Lithology and Mineralogy", Paper SPE 102770-MS, pp. 1-13, presented at the SPE 81st Annual Technical Conference and Exhibition, San Antonio, Texas, Sep. 2006.

Ouenes, A., "Practical Application of Fuzzy Logic and Neural Networks to Fractured Reservoir Characterization", Computers & Geosciences, vol. 26 (No. 8), pp. 953-962; Oct. 1, 2000.

Paktunc, A.D., "MODAN: An Interactive Computer Program for Estimating Mineral Quantities Based on Bulk Composition", Computers & Geosciences, vol. 24 (No. 5), pp. 425-431; Jun. 15, 1998.

Cohen, D. and Ward, C.R., "SEDNORM—A Program to Calculate A Normative Mineralogy for Sedimentary Rocks Based on Chemical Analyses", Computers & Geosciences, vol. 17 (No. 9), pp. 1235-1253; Oct. 1991.

Caritat, P., Bloch, J., and Hutcheon, I, "LPNORM: A Linear Programming Normative Analysis Code", Computers & Geosciences, vol. 20 (No. 3), pp. 313-347; Apr. 1994.

Office Action Received from Corresponding Eurasian Patent Application No. 200802137, dated Nov. 2, 2009.

English-language translation of Office Action Received from Corresponding Eurasian Patent Application No. 200802137, dated Nov. 2, 2009.

Hertzog, R.; Colson, L.; Seeman, B.; O'Brian, M.; Scott, H.; McKeon, D.; Wraight, P.; Grad, J.; Ellis, D.; Schweitzer, J., & Herron, M., "Geochemical Logging With Spectrometry Tools", SPE Formation Evaluation, vol. 4, pp. 153-162 (Jun. 1989).

Herron, Michael M., "Geochemical Classification of Terrigenous Sands and Shales from Core or Log Data," Journal of Sedimentary Research, vol. 58 (No. 5), pp. 820-829 (Sep. 1988).

Moore, Bruce R. & Dennen, William H., "A Geochemical Trend in Silicon-Aluminum-Iron Ratios and the Classification of Clastic Sediments", Journal of Sedimentary Petrology, vol. 40 (No. 4), pp. 1147-1152 (Dec. 1970).

Saller, Arthur H. & Henderson, N., "Distribution of Porosity and Permeability in Platform Dolomites: Insight from the Permian of West Texas", AAPG Bulletin, vol. 82 (No. 8), pp. 1528-1550 (Aug. 1998).

Folk, Robert L., "Introduction to Sedimentary Rocks" and "Petrology of Sandstones", in Petrology of Sedimentary Rocks, Hemphill Publishing Co., Austin (TX); pp. 1-7, 102-110 (1974).

Dunham, Robert J., "Classification of Carbonate Rocks According to Depositional Texture", in Classification of Carbonate Rocks—A Symposium; Memoir 1, William E. Ham, ed.; The American Association of Petroleum Geologists, Tulsa (OK); pp. 108-121 (1962).

Palanche, C.; Berman, H. & Frondel, C., "The System of Mineralogy of James Dwight Dana and Edward Salisbury Dana—vol. I. Elements, Sulfides, Sulfosalts, Oxides", 7th Ed., John Wiley and Sons, Inc., New York; pp. 1-8, 37-48 (1951).

Rollinson, Hugh R., Using Geochemical Data: Evaluation, Presentation, Interpretation; John Wiley & Sons, Inc., New York (NY); pp. 73-84 (1993).

Lofts, J.C.; Harvey, P.K.; Lovell, M.A. & Locke, J., "Application of Induced Gamma-Ray Spectroscopy Measurements: Characterization of a North Sea Reservoir," IEEE Transactions on Nuclear Science, vol. 41 (No. 1), pp. 360-363 (Feb. 1994).

Herron, Susan L., "Chapter 13—In Situ Evaluation of Potential Source Rocks by Wireline Logs," in Source and Migration Processes and Evaluation Techniques, Merrill, Robert K., Ed., The American Association of Petroleum Geologists; Tulsa (OK): pp. 127-134 (1991).

"Current Trends in Nuclear Borehole Logging Techniques for Elemental Analysis," Proceedings of a Consultants Meeting Organized by the International Atomic Energy Agency and Held in Ottawa, Canada Nov. 2-6, 1987, IAEA-TECDOC-464; International Atomic Energy Agency, Vienna, 1988.

Lofts, J.C.; Harvey, P.K.; Lovell, M.A., "A Stochastic Approach to Mineral Modelling of Log Derived Elemental Data," International Journal of Radiation Applications & Instrumentation Physics, Part E. Nuclear Geophysics, vol. 8 (No. 2), pp. 135-148 (1994).

Harvey, P.K.; Lovell, M.A.; Lofts, J.C.; Pezard, P.A.; & Bristow, J.F., "Petrophysical Estimation from Downhole Mineralogy Logs", in "Developments in Petrophysics: Geological Society Special Publication No. 122," Lovell, M.A. & Harvey, P.K., Eds.; The Geological Society (London): pp. 141-157 (1997).

Pettijohn, F.J., "Chapter S. Chemical Composition of Sandstones—Excluding Carbonate and Volcanic Sands", in Data of Geochemistry, 6th Ed., Michael Fleischer, Ed.; Geological Survey Professional Paper 440-S, pp. S1-S-21; United States Government Printing Office, Washington: 1963.

* cited by examiner

METHODS FOR QUANTITATIVE LITHOLOGICAL AND MINERALOGICAL EVALUATION OF SUBSURFACE FORMATIONS

CROSS REFERENCE TO RELATED APPLICATIONS

The present application claims priority to U.S. Provisional Patent Application Ser. No. 60/793,477 filed Apr. 19, 2006, and U.S. Provisional Patent Application Ser. No. 60/817,226 filed Jun. 28, 2006, the contents of all of which are incorporated herein by reference.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

1. Field of the Invention

This disclosure relates generally to methods for determining the lithology and mineralogy of a subterranean formation, and more particularly, to methods for determining the general lithology, specific lithology and mineralogy of a subterranean formation using artificial intelligence systems and well log data.

2. Description of the Related Art

There has long been a need for open-hole logging tools and methods that would be capable of providing measurements of the lithology and mineralogy of a geologic formation in selected directions, providing measurements of the both the mineralogy and lithology both close to the bore hole and deep into the subterranean formation, and provide all such measurements with high vertical and lateral resolution. Quantitative information about the reservoir rock lithology and associated minerals is important not only for determining the producing potential for a specific formation, but for making technical and business decisions in hydrocarbon exploration and exploitation as well. For example, exploration geologists can use rock mineralogy information associated with subterranean formations to reduce the risk in discovering hydrocarbons by determining the thermal and diagenetic history of the specific formation, defining the provenance (source area) and the depositional environments of the sediments in the formation, and correlating certain minerals with well logs. Formation mineralogy information can also be used during the exploration process to assess reservoir quality, develop effective depletion strategies, and predict the effect of rock-fluid interactions, while during the production process it can be used to design work-over and completion strategies, such as selection of drilling fluids and proper stimulation methods (e.g., effective acidizing or fracturing applications).

The interpretation of formation lithology, both general and specific, is also important. For example, quantitative knowledge of the lithological constituents present in a subterranean formation surrounding a well, as a function of depth, could be valuable in assessing all aspects of exploration, evaluation, production and completion. For example, suitable applications could include regional studies of facies architectures, estimating distributions of reservoir facies, establishing quantities of clay materials in all layers, identifying subtle and pronounced changes in depositional or diagenetic facies by characterizing the formation minerals, and planning enhanced recovery strategies.

Traditional methods of determining subterranean formation lithology and mineralogy have used cores from wellbores, which are often analyzed using X-ray diffraction techniques and the like. However, such traditional methods are very time-consuming, and are not efficient for use in exploration applications. Consequently, through the use of a variety of logging tools, numerous attempts to estimate, evaluate, and interpret both the lithologies and the mineralogy of subsurface formations by transforming log data into lithology and/or mineralogy logs have been made.

For example, methods have been suggested for the in situ examination of subsurface formations penetrated by a borehole in order to ascertain the cation-exchange capacity of such formations within select geological regions. Using natural gamma ray logging, signals were developed that functionally relate to the total gamma radiation and to the potassium, uranium and thorium energy-band radiations. According to these methods, the cation-exchange capacities of core samples can be determined by correlation with selected parameters provided by the gamma ray spectrometer to establish functional relationships. Cation-exchange capacities of formations in subsequent boreholes within the same and surrounding regions can then be determined in situ by use of the natural gamma ray spectrometer and these established relationships. This technique is of seemingly limited utility, however, because cation-exchange capacity is being reportedly correlated to elements that generally have very little global relation to clay or other similar minerals that dictate cation-exchange capacity.

Other methods described in the art provide for quantifying and characterizing mineral content of a subterranean formation as a function of well depth. According to these methods, elemental data derived from logging tools can be input into an element-mineral transform mathematical operation, such as a matrix of the type constructed using multivariate statistical analysis methods, in order to determine the quantity of at least one or more of the dominant minerals within in the formation under evaluation. From both the mineral quantity information and the elemental log data, the formation minerals can be predicted or hypothesized. Other related methods and associated apparatus suggest methods and apparatus for determining formation lithology using gamma ray spectroscopy, using inelastic scattering gamma ray spectra taken in a borehole and analyzed by a least squares spectral fitting process to determine the relative elemental contributions thereto of chemical elements postulated to be present in unknown earth formations and contributing to the measured spectra from the formations. In some reports, based on the calibrated inelastic yields for selected elements, calibrated estimates of the elemental yields from measured thermal neutron capture gamma ray spectra may also be determined, from which further information concerning formation lithology may be derived or theorized.

More recently, several methods for quantifying the lithologic composition of formations surrounding boreholes have been suggested. Such methods typically involve the construction of two or more lithology compositional models from known well log data for a formation, and the subsequent combination of the models in order to determine a range of possible solutions having an upper limit defined by a pure component model and a lower limit defined by a proportional mixture model, thus allowing the maximum concentration of any lithologic component to vary between 0% and 100%.

Other reports directed to the estimation of mineralogy have been reported by Harvey, et al. [SPWLA 33$^{rd}$ Annual Logging Symposium, pp. 1-18 (1992); and Core-Log Integration, Geological Society (London), Vol. 136: pp. 25-38 (1998)], as well as by Hertzog, et al. [*Society of Petroleum Engineers*. SPE paper No. 16792, pp. 447-460 (1987); *SPE Formation Evaluation*, Vol. 4, pp. 153-162 (1989)]. Several of these techniques describe the use of pulsed neutron devices, direct activation of the formation, and the natural gamma spectra of the formation, for use in obtaining continuous well logs of the major element chemistry of a formation. These tools and methods offer measurements of Si, Al, Ti, Fe, Ca, K, S and the minor elements Gd, Th and U, together with H and Cl. Transformation of the major elements into the more conventional oxide forms provides virtually complete major element oxide analysis at each measured depth interval down the borehole. However, the transformation of a rock's elemental composition to mineral and lithological assemblages has been the subject of numerous approaches, ranging from linear programming and genetic algorithms to numerical models such as least squares minimization.

For example, element to mineral transformation algorithms, used for quantifying minerals from downhole nuclear spectroscopy elemental data, have had limited success in representing the bulk chemical composition of a rock in terms of its mineralogy. More specifically, because the minerals of rock matrices contain many of the same elements in their crystal structures, quantification-type methods for determining minerals in subterranean rock formations, e.g., silicate minerals, using only chemistry or chemistry-based methodologies, without a priori knowledge of the minerals present, can result in problems involving non-unique solutions resulting from compositional colinearity [see, Harvey, P. K., et al., *Developments in Physics*, Vol. 122: pp. 141-157 (1997); and, Lofts, J. C., et al., *Nuclear Physics*, Vol. 8: pp. 135-148 (1994)]. This challenge can in turn result in a poor estimate of those phases having similar compositions, which then in turn leads to errors in quantifying other phases in the rock, a problem which magnifies exponentially for each quantification process. In particular, element-to-mineral transformations using traditional, least squares methods and the like have been found susceptible to colinearity, rendering them substantially unreliable for mineral quantification [Chakrabarty, T., et al., *J. Can. Petroleum Technology*, Vol. 36: pp. 15-21 (1997)].

Further, many of the existing logging tools and methods, such as those described briefly herein, are unable to provide the adequate penetration into the geologic formation surrounding the borehole necessary to provide the requisite detailed geological information many well-log operators and analysts are looking for. In addition, many existing logging tools are not directional, and the resolution of measurements is also limited, particularly at greater distances into the geologic formation. Further, and perhaps more importantly, existing methods for determining subterranean lithology and/or mineralogy are based on determining the mineralogy of the formation first, and then attempting to determine or correlate the lithology to the mineralogy. However, this is severely limiting, as errors in determining the mineralogy (such as errors that can occur in transforming the major elements into the more conventional oxide forms) can translate into significantly erroneous lithology characterizations.

This application for patent discloses methods for the determination of subterranean formation mineralogy from formation lithology data, using an artificial intelligence system which uses elemental measurements obtained from downhole tools comprising pulsed neutron devices to generate algorithms which can then be used to define the general lithology, then the specific lithology, and finally the mineralogy of a subterranean formation surrounding a wellbore or similar earth borehole.

BRIEF SUMMARY OF THE INVENTION

In an embodiment of the present invention, a method for estimating the lithology and mineralogy of a formation surrounding a borehole is described, wherein the method comprises traversing the borehole with a well logging system, obtaining wellbore data regarding the formation with the well logging system, generating a lithology compositional model, and generating a mineralogy compositional model by further constraining the lithology compositional model. In accordance with aspects of this embodiment, the well logging system may comprise a neutron source, a gamma-ray detector, or both. In further accordance with aspects of this embodiment, the generation of the compositional models may be performed by one or more artificial intelligence systems, such as expert systems, neural networks, genetic algorithm-based systems, fuzzy logic systems, look-up tables, cluster analysis systems, and combinations thereof. In further accordance with this embodiment, the method may further comprise obtaining additional wellbore data about the formation surrounding the wellbore using secondary well logging data sources, including NMR logging data, bulk density data, resistivity data, sonic or acoustic data, neutron porosity data, photo-electric cross-section data, high definition induction log data, bulk density correction data, spectral gamma ray data, differential caliper data, core data, spontaneous potential log data, X-ray diffraction or X-ray fluorescence data, and combinations thereof.

In a further embodiment of the present invention, a method for estimating the lithology and mineralogy of a formation surrounding a borehole is described, wherein the method comprises traversing the borehole with a well logging system, obtaining wellbore data regarding the formation with the well logging system, generating a lithology compositional model, and generating a mineralogy compositional model, wherein the mineralogy compositional model is not generated prior to the generation of the lithology compositional model. In accordance with aspects of this embodiment, the well logging system may comprise a neutron source and/or a gamma-ray detector capable of measuring capture gamma radiation, inelastic gamma radiation, natural gamma radiation, or combinations of such radiation. In further accordance with aspects of this embodiment, the generation of the compositional models may be performed by one or more artificial intelligence systems, such as expert systems, neural networks, genetic algorithm-based systems, fuzzy logic systems, look-up tables, cluster analysis systems, and combinations thereof. In further accordance with this embodiment, the method may further comprise obtaining additional wellbore data about the formation surrounding the wellbore using secondary well logging data sources, including but not limited NMR logging data, bulk density data, resistivity data, sonic or acoustic data, neutron porosity data, photo-electric cross-section data, high definition induction log data, bulk density correction data, spectral gamma ray data, differential caliper data, core data, spontaneous potential log data, X-ray diffraction or X-ray fluorescence data, and combinations thereof.

In yet another embodiment of the present invention, an apparatus for making measurements of the mineralogy of an earth formation surrounding a borehole is described, wherein the apparatus comprises an electromagnetic radiation system which irradiates the earth formation surrounding at least a portion of the borehole and measures received radiation, and a processor coupled to the electromagnetic radiation system, wherein the processor comprises an artificial intelligence system that generates a lithology compositional model and a mineralogy compositional model based on data from one or more detectors. In accordance with this embodiment of the invention, the electromagnetic radiation system includes at least one of a neutron source, a neutron detector, or a gamma-ray detector.

In yet another embodiment of the present invention, methods for determining the lithology of a formation surrounding an earth borehole are described, wherein the method comprises traversing the earth borehole with a well logging system comprising a neutron source; obtaining elemental concentration data (such as concentration per unit weight data) from the formation with the well logging system; generating a series of algorithms with an artificial intelligence system; generating a general lithology compositional model; and generating a specific lithology compositional model to determine or estimate formation lithologies from the compositional models. In accordance with aspects of this embodiment, the neutron source is an electronic pulsed neutron source, which can optionally further comprise a detector, such as a gamma-ray detector. In further accordance with aspects of this embodiment, the artificial intelligence system may be selected from the group consisting of expert systems, neural networks, genetic algorithm-based systems, fuzzy logic systems, cluster analysis systems, and combinations thereof. In still further accordance with aspects of this embodiment, the method may further comprise determining or estimating the mineralogy of the formation surrounding the borehole by generating a mineralogy compositional model after generating the lithology compositional model or models.

In further accordance with aspects of this embodiment, the general lithology compositional model comprises determinants of sands, shales, carbonates (including both limestones and dolostones), evaporites, coal, and combinations thereof. In additional aspects of this embodiment, a specific lithology compositional model can be generated, which can then be used to determine the specific lithology of a formation surrounding the earth borehole. Specific lithologies that can be determined include but are not limited to quartzose, feldspathic sand, lithic sand, shaley sand, limey quartzose, limey feldspathic sand, anhydritic limestone, calcic anhydrite, sandy shale, calcic shale, and combinations thereof.

In a further embodiment of the present invention, methods for determining the lithology and mineralogy of a formation surrounding an earth borehole are described, wherein the method comprises traversing the earth borehole with a well logging system comprising a neutron source; obtaining elemental concentration per unit weight data from the formation with the well logging system; generating a series of algorithms using an artificial intelligence system; generating a general lithology compositional model; generating a specific lithology compositional model; generating a mineralogy compositional model; and determining or estimating the mineralogy and the lithology of at least a portion of the formation surrounding the earth borehole from the compositional models. In accordance with aspects of this embodiment, the neutron source may be an electronic pulsed neutron source, which can optionally further comprise a detector, such as a gamma-ray detector. In further accordance with aspects of this embodiment, the artificial intelligence system may be selected from the group consisting of expert systems, neural networks, genetic algorithm-based systems, fuzzy logic systems, cluster analysis systems, and combinations thereof.

In a further embodiment of the present invention, processes for producing hydrocarbon material from a subterranean formation are described, wherein the processes comprise providing a wellbore extending through at least a portion of the subterranean formation; providing a conduit in fluid communication with a hydrocarbon producing zone within the subterranean formation; traversing the wellbore with a logging instrument; measuring at least one parameter of the subterranean formation surrounding the wellbore with the logging instrument; determining the lithology and mineralogy of at least a portion of the subterranean formation surrounding the wellbore using an artificial intelligence system; and producing a hydrocarbon fluid material from a producing zone of the subterranean formation surrounding the wellbore. In accordance with aspects of this embodiment, the logging instrument can comprise a pulsed neutron source, a gamma ray detector, or a combination thereof. In further aspects of this embodiment, the lithology determined can comprises sands, shales, carbonates (dolostones and limestones), evaporites, coal, and combinations thereof.

BRIEF DESCRIPTION OF THE SEVERAL VIEWS OF THE DRAWINGS

The file of this patent contains at least one drawing executed in color. Copies of this patent with color drawings will be provided by the Patent and Trademark Office upon request and payment of the necessary fee.

The following figures form part of the present specification and are included to further demonstrate certain aspects of the present invention. The invention may be better understood by reference to one or more of these figures in combination with the detailed description of specific embodiments presented herein.

Figure 1:
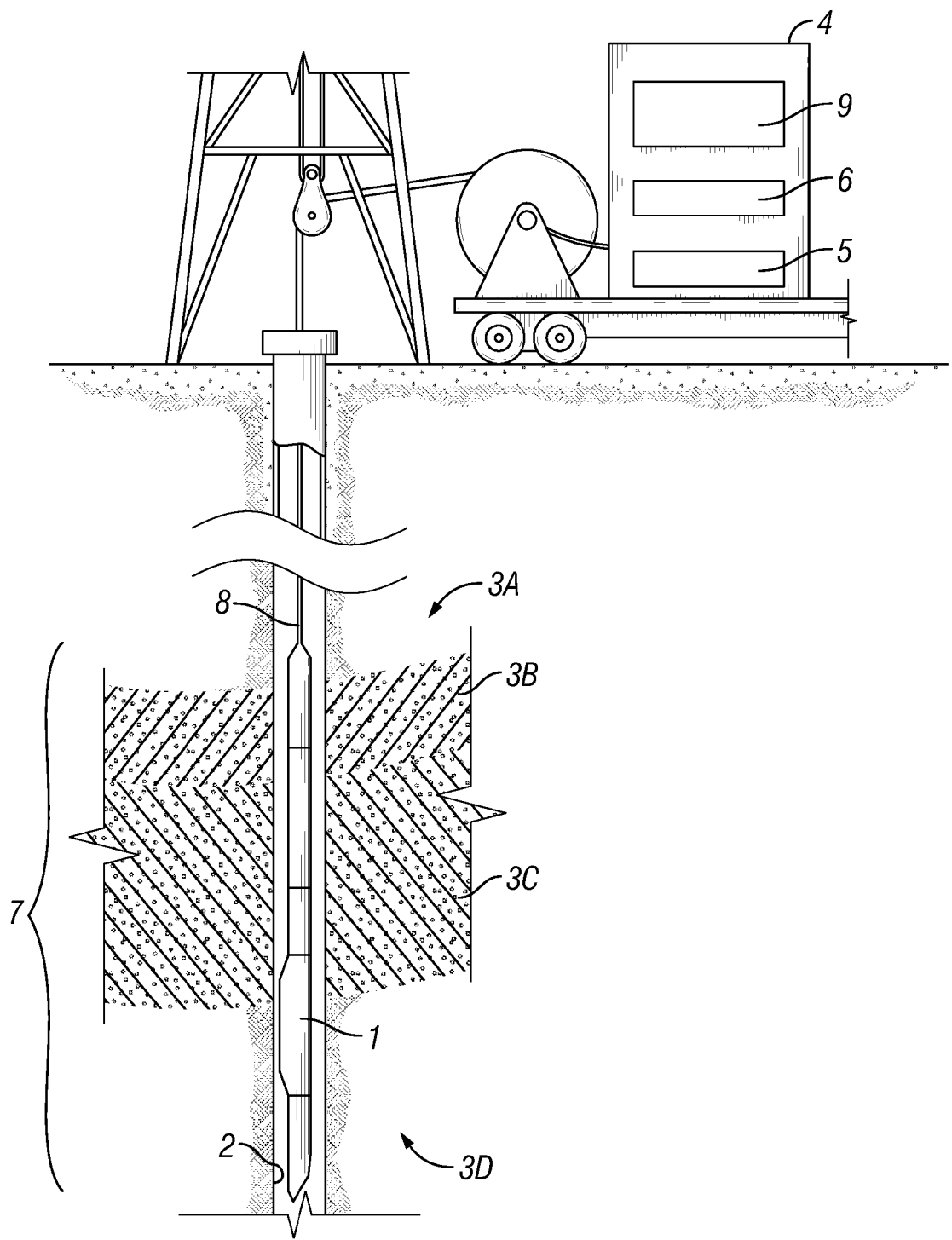
FIG. 1 illustrates a well logging apparatus disposed in a wellbore penetrating earth formations.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

One or more illustrative embodiments incorporating the invention disclosed herein are presented below. Not all features of an actual implementation are described or shown in this application for the sake of clarity. It is understood that in the development of an actual embodiment incorporating the present invention, numerous implementation-specific decisions must be made to achieve the developer's goals, such as compliance with system-related, business-related, government-related and other constraints, which vary by implementation and from time to time. While a developer's efforts might be complex and time-consuming, such efforts would be, nevertheless, a routine undertaking for those of ordinary skill the art having benefit of this disclosure.

In general terms, Applicants have created processes and methods for determining the lithology and mineralogy of a subterranean formation surrounding a wellbore.

Elemental Inputs

FIG. 1 shows a well logging apparatus 1 for use with the methods and process described in the present invention, wherein the well logging apparatus is disposed in a wellbore 2 drilled through earth formations 3A, 3B, 3C, and 3D in order to make measurements of properties of the earth formations 3A, 3B, 3C, and 3D. The wellbore 2 in FIG. 1 can be filled with a liquid suspension known in the art as "drilling mud". In accordance with aspects of the present disclosure, the term "wellbore" as used herein includes but is not limited to cased wellbores, partially-cased wellbores, and non-cased wellbores. A string of one or more logging tools 7, which can include a neutron apparatus as well as a plurality of additional logging tools or sondes, is typically lowered into the wellbore 2 by a means of an armored electrical cable 8 or its equivalent. The cable 8 can be spooled and unspooled from a winch or drum of any type known in the art. The tool string 7 may be electrically connected to surface equipment 4 by an insulated electrical conductor (not shown in FIG. 1) forming part of the cable 8. The surface equipment 4 can include one part of a telemetry system 5 for communicating control signals and data between the tool string 7 and a computer 6. The computer 6 can also include a data recorder 9 for recording measurements made by the apparatus and transmitted to the surface equipment 4. In certain aspects of the present invention, the apparatus 1 may include a processor coupled to one or more electromagnetic radiation systems or sources, as will be discussed below, such that the processor is contained within, or is directly associated with, the logging tool 7. In accordance with aspects of the present invention, the logging tool 7 preferably comprises a neutron sources, such as a pulsed neutron source, as known in the art. In further aspects of the present invention, the logging tool 7 further comprises an elemental gamma ray detector capable of measuring capture gamma radiation, inelastic gamma radiation, natural gamma radiation, and combinations thereof. Suitable well logging tools for use in the methods of the present invention and for providing elemental concentration (per unit weight) data and/or elemental oxide data about the formation surrounding the wellbore (equivalently referred to herein as an earth borehole) include, but are not limited to, those described, for example, in U.S. patent application Ser. No. 10/916,921, entitled "Elemental Gamma Ray Signature Instrument"; and U.S. patent application Ser. No. 11/223,352, entitled "Method and Apparatus for Determining Aluminum Concentration in Earth Formations", both of which are incorporated herein by reference in their entirety.

Figure 2A:
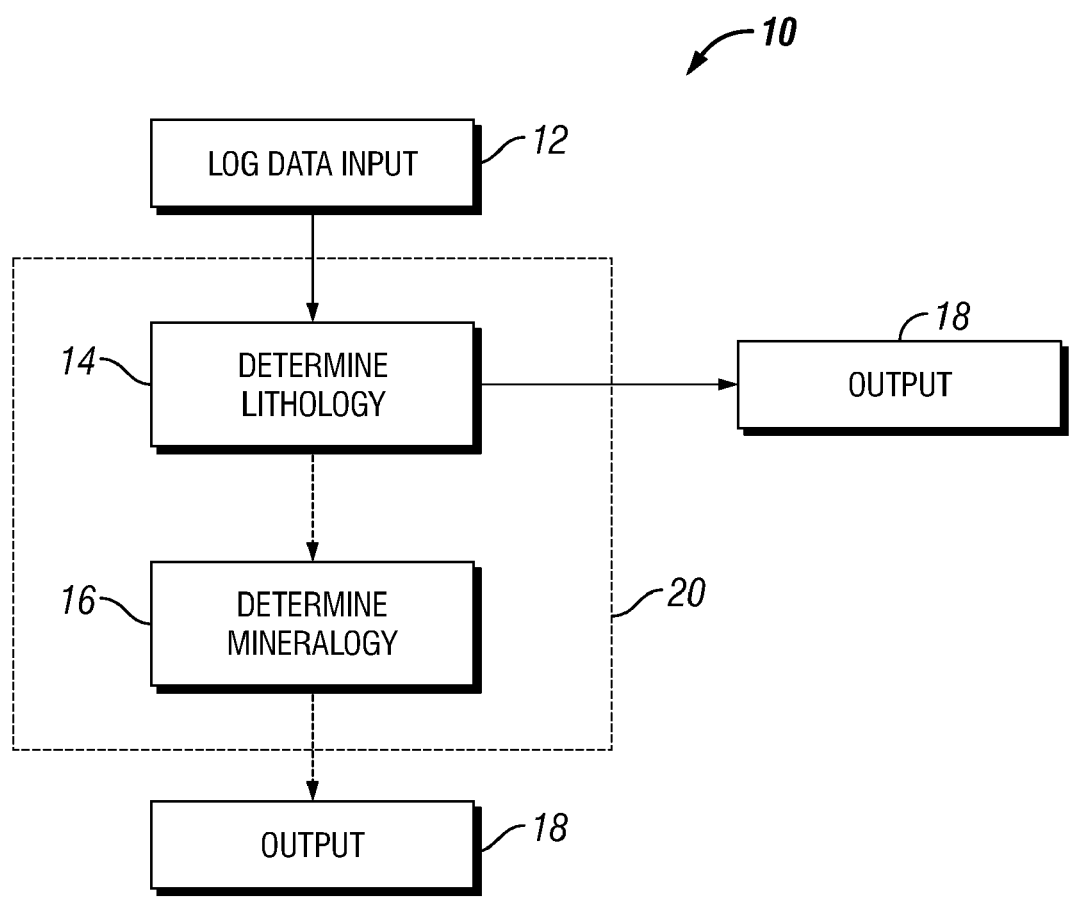
FIG. 2A illustrates a general flowchart outlining methods for establishing the mineralogy of a subterranean formation.

Turning now to FIG. 2A, an overall process flow diagram for the methods of the present invention is illustrated. As shown therein, and in accordance with an embodiment of the present invention, the overall process 10 for quantitatively determining the lithology of a subterranean formation having a wellbore extending therethrough comprises obtaining log data 12 for a subterranean formation (or portion thereof) to be analyzed, determining the lithology of the subterranean formation 14, and then generating output and data 18 which described the lithology of at least a portion of the subterranean formation surrounding the wellbore. As further illustrated within FIG. 2A, the method can further comprise the process of determining the mineralogy of the subterranean formation 16 based on the lithology information that has been determined, and then generating output and data 18 useful in understanding both the mineralogy and lithology within the subterranean formation surrounding the wellbore. This may be especially useful in and around wellbores penetrating through a subterranean formation, for use in producing hydrocarbons. According to the methods and processes of the present invention, the determination of the lithology (including both the general lithology and/or the specific lithology of a formation) and the mineralogy of a subterranean formation are accomplished using an artificial intelligence system (20), such as an expert system or a neural network, as will be discussed in more detail herein.

Figure 2B:
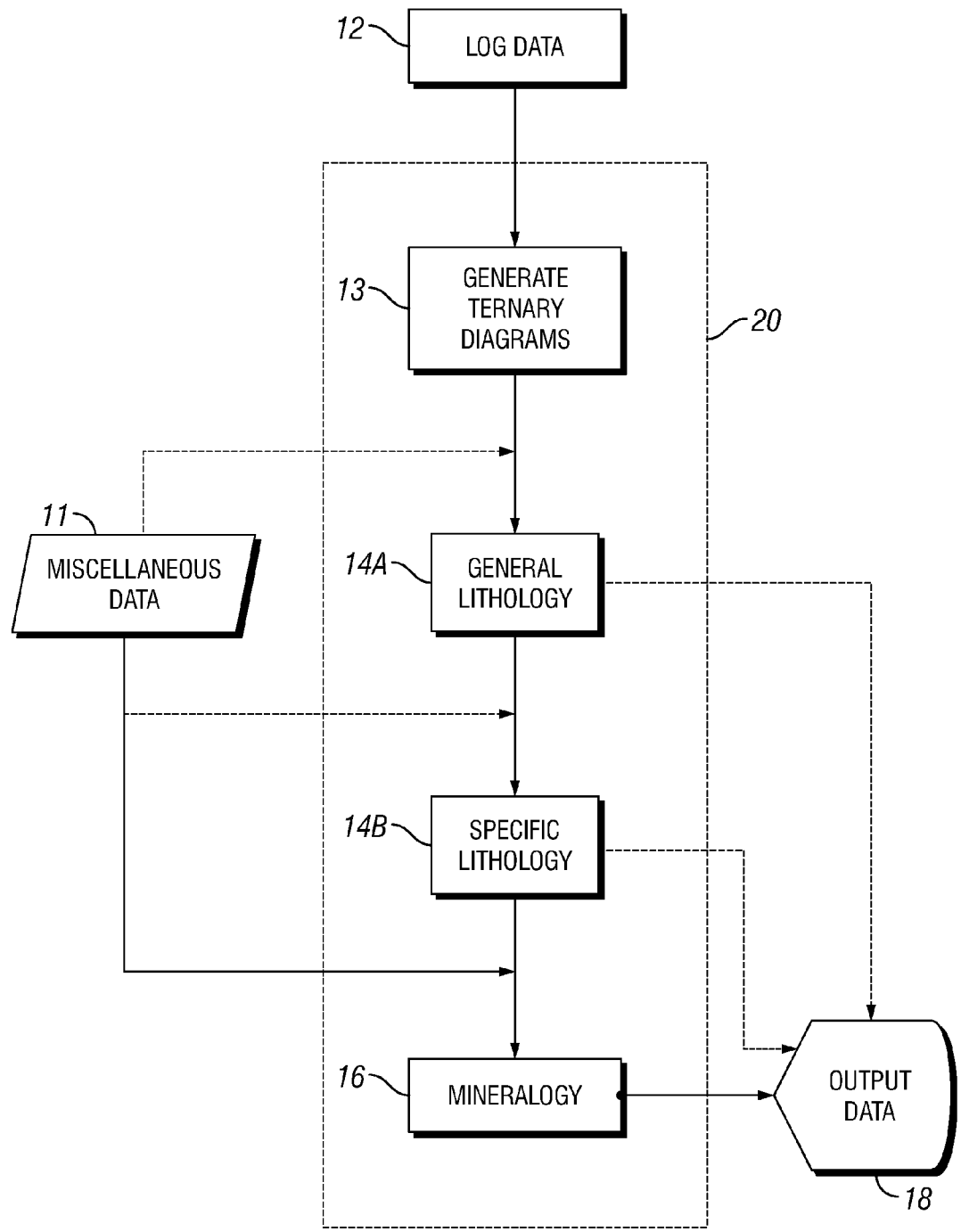
FIG. 2B illustrates a flowchart showing details of the methods for establishing the mineralogy of a subterranean formation, illustrated in FIG. 2A.

FIG. 2B illustrates a flow chart of a further embodiment of the present disclosure, wherein log data 12 is obtained from at least a section of the subterranean formation surrounding the wellbore or borehole. This log data is converted to elemental data which is presented as major element oxides and element information and is then fed to artificial intelligence system 20, which generates ternary diagrams 13, providing this information in analog or graphical form, as desired. A series of algorithms, using the artificial intelligence system 20, may then developed from the ternary diagrams. In other aspects of the present disclosure, the algorithm may be used to develop ternary diagrams useful in determining the geochemistry (lithology and mineralogy) of the subterranean formation. As will be discussed in more detail herein, such ternary diagrams that may be generated can be standard ternary diagrams capable of segregating different lithologies from one another, such as those described by Pettijohn, et al. [*USGS Professional Paper* 440-S, p. 19 (1963)], or hybrid ternary diagrams, both of which can then in turn be used to further develop the artificial intelligence system 20 for use in determining the general lithology 14a, as well as the specific lithology 14b of the formation. For purposes of the present disclosure, those of skill in the art will understand that the term "hybrid ternary diagram" refers to modified ternary diagrams which provide compositional information about one or more lithologies by plotting the normalized ratio between two (or more) elements (or their elemental oxides) and an actual elemental component of the geological sample, allowing for the differentiation of specific lithologies. As further illustrated within FIG. 2B, upon determination of either the general lithology, the specific lithology, or both, the geochemical information can be generated as output data 18. Optionally, and as will be described in more detail below, the lithology compositional data can be used to determine the mineralogy 16. Regardless of the pathway selected, such output data 18 can be in any appropriate format, including but not limited to lithology vs. depth plots, general lithology vs. depth plots, specific lithology vs. depth plots, mineralogy vs. depth plots, ternary diagrams, modified ternary diagrams, hybrid ternary diagrams and diagram sets, and bivariate (X-Y) plots, as well as combinations or modifications of such output formats. An example of an exemplary combination output plot will be discussed in reference to FIG. 11 herein.

In accordance with certain aspects of the present invention, the methods of the present invention can further comprise obtaining additional logging data 11 from both geochemical logs and conventional well logs, in order to generally identify and quantify minerals in sedimentary rocks. As illustrated in FIG. 2B, this additional logging data 11 can be then be used, in combination with the general and specific lithology information (14a and 14b) to determine the mineralogy 16 of at least a portion of the subterranean formation surrounding the wellbore. Optionally, and equivalently, additional wellbore cuttings, core data, or logging data 11 can be used to enhance and better determine the general lithology, the specific lithology, or both, which can then be directly converted to lithology-based output data 18.

Types of additional log data (11) suitable for use herein include but are not limited to core data (such as X-ray diffraction data) and core cutting data, as well as well log data obtained from carbon/oxygen (C/O) logging (carbon/oxygen (C/O)) measurements, which allows the operator to monitor the reservoir through casing and tubulars in a time-lapse fashion over the life of the well independent of formation water salinity; sonic or acoustic measurements and the resultant data; resistivity (both shallow and deep) logging data; spontaneous potential (SP) logging data; photo-electric (PE) cross-section logging data; gamma ray (GR) logging data; high-definition induction logs (HDIL) and similar logs that measure resistivity, including open hole electric wireline tools; bulk density correction (ZCOR) data; compensated bulk density data (ZDEN); borehole-corrected compensated neutron porosity (CNC); micro-lateralog resistivity (RMLL) data; nuclear magnetic resonance (NMR) logging techniques and data acquired from such techniques, including but not limited to magnetic resonance imaging logging (MRIL), density ($\phi$) NMR data, and NMR-derived clay bound water (CBW) volume determination and measurements; SpectraLog® (K, U, Th) data, and similar spectral gamma ray tools and their resultant data; caliper (continuous recordation of well diameter, usually recorded in inches) measurement data, including DCAL (differential caliper) data; or combinations of two or more of these data sources.

Figure 4:
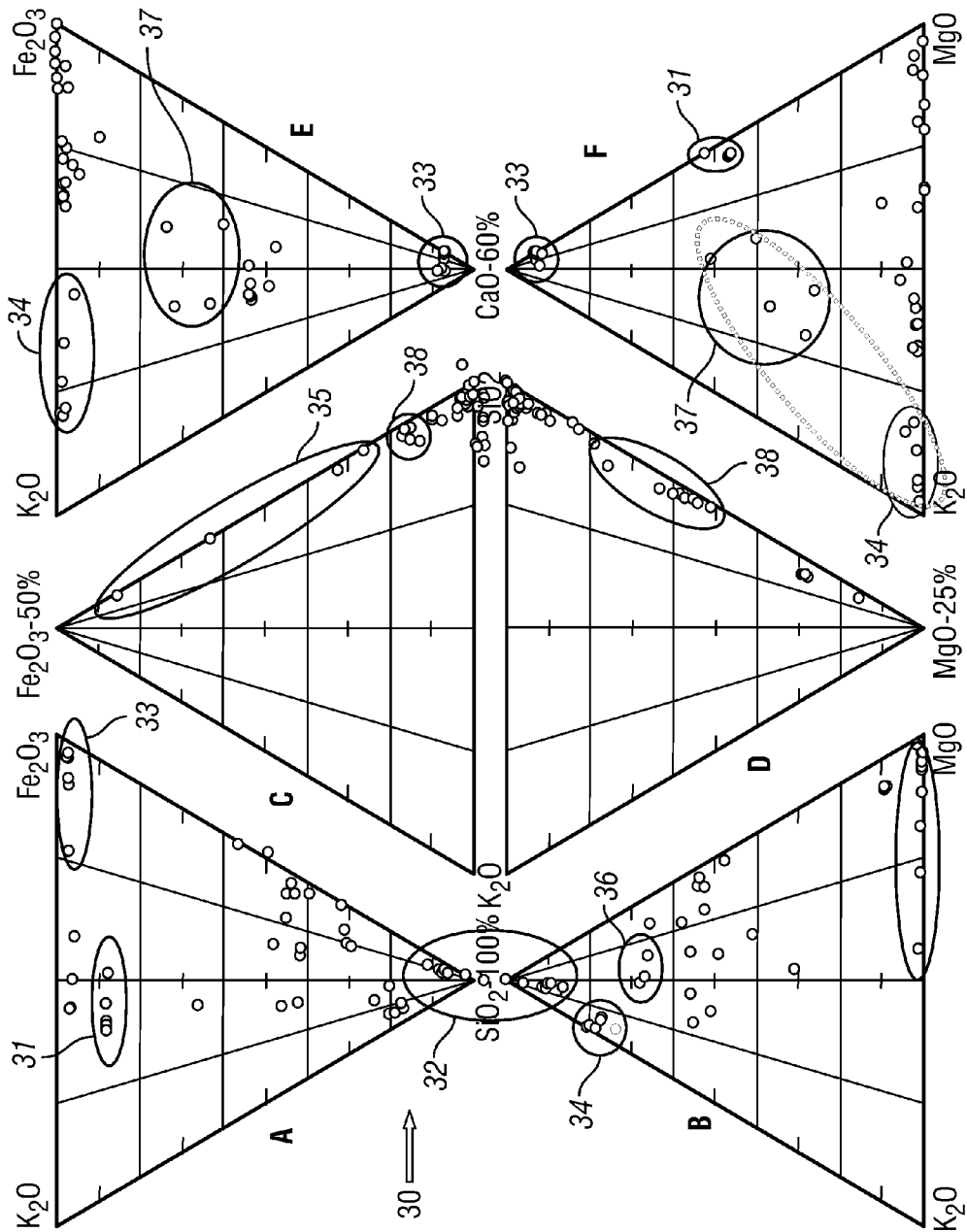
FIG. 4 illustrates a set of hybrid ternary diagrams used to develop an expert system for specific lithologies.

Returning to FIG. 2B, having obtained log data 12 that provides elemental information of certain major elements, including but not limited to silicon, potassium, magnesium, calcium, carbon, iron, chlorine, titanium, thorium, manganese, gadolinium, aluminum and sulfur, a computer system, which can be any suitable computer system known in the art, such as a standard human-machine interface (HMI) or the equivalent, uses a series of algorithms based on the elemental data. These algorithms will be described in more detail below, but generally speaking these algorithms comprise at least a portion of the artificial intelligence system 20. As indicated previously, the artificial intelligence systems suitable for use with the present invention include, but are not limited to, expert systems, neural networks, genetic algorithm-based systems, fuzzy logic systems, cluster analysis systems, and systems that are a combination of two or more of these systems. Utilizing the weight percent of major element oxides and elements, the artificial intelligence system 20 generates ternary discrimination diagrams 13, such as those described in the art by H. Rollinson [*Using Geochemical Data: Evaluation, Presentation, Interpretation*; John Wiley, Hoboken, N.J.: 1993]. These ternary discrimination diagrams 13 may comprise standard ternary diagrams which illustrate relationships between selected elements based on their contribution to the observed mineral assemblage and to their modal abundance, as known in the art, as well as sets of hybrid ternary diagrams, as illustrated in FIGS. 4 and 8B herein. Using appropriate ternary diagram information, and values from such diagrams, the system 20 can develop algorithms using this information that allows for the development of compositional models, such as a general lithology compositional model 14a. As part of the algorithm development, a series of logic flow diagrams can be used, as will be discussed in more detail below. At this point, at the discretion of the user, the system 20 can provide the general lithology compositional information about the subterranean formation surrounding the wellbore as output data 18, in an appropriate format, such as a general lithology vs. depth plot. Otherwise, the artificial intelligence system 20 proceeds to generate a specific lithology compositional model 14b, using a series of logic flow diagrams that are based upon the general lithology compositional model that has been generated. This specific lithology compositional model, and the associated information, can be provided as output data 18 in an appropriate format, such as a specific lithology vs. depth plot, or, equally acceptable, the information from the specific lithology compositional model can be used to generate a mineralogy compositional model 16. In this instance, using a combination of both the general and specific lithology compositional models, the artificial intelligence system 20 can proceed to generate a mineralogy compositional model 16 of at least a portion of the subterranean formation surrounding the wellbore. The system 20 may then convert the compositional model into appropriately formatted output data 18, such as a mineralogy vs. depth plot or similar output format. In accordance with aspects described previously in reference to FIG. 2A, additional data 11 from other logging devices or logging information sources, such as NMR well-log data or SpectraLog®, SpectraLog™ II, data may optionally be integrated in the system 20 to further refine the general lithology compositional model 14a, the specific lithology compositional model 14b, the mineralogy compositional model 16, all three compositional models, or combinations of these models.

Artificial Intelligence System

The artificial intelligence system (AIS), referred to herein generally as system 20, is used in association with the present invention for a plurality of geochemical analysis functions, including but not limited to generating graphical or other presentations of ternary, hybrid ternary diagrams, and bivariate plots/diagrams, as will be described in more detail herein, as well as in using chemistry information and chemical ratios based on elemental information from well logging tools to establish the general lithology, specific lithology, and the mineralogy of the rock surrounding a wellbore extending into a subterranean formation.

As used herein, artificial intelligence system includes but is not limited to expert systems, neural networks, genetic algorithms, fuzzy logic systems, fuzzy neural networks, and cluster analysis systems, as well as combinations of two or more such systems interacting. Such artificial intelligence systems include any system capable of the acquisition and analysis of well log data. More specifically, the artificial intelligence system 20 can develop one or more algorithms from normalized ratios between elemental information, such as elemental oxide information, as provided by the well logging tool. This information may then be plotted on ternary diagrams, which are in turn used for delineating and determining general lithologies. The general lithologies which can be delineated and thus determined using this methodology include sands, carbonates, anhydrites, coal, and shales, as will be described in more detail herein. Additional algorithms, further developed from well log data such as elemental oxide ratios, e.g, ratios including ratios between tow or more of $K_2O$, MgO, $Fe_2O_3$, as well as elemental determinates (such as the magnesium oxide and calcium oxide ternary values, MgT and CaT, respectively, and elemental concentration per unit weight values) and specific discriminators, obtained from elemental and chemical information plotted on ternary diagrams or hybrid ternary diagrams, allows the general lithology classifications to be narrowed to determine the specific lithologies.

The artificial intelligence system 20 used herein and useful in generating the algorithms used to define the general lithology, specific lithology, and/or mineralogy of a rock can be written or modeled in any number of known computer programming languages or systems, including neural networks and VisualBasic (MicroSoft®). Other normative lithological and mineralogical computer programming approaches that have been used for rock analyses and that are generally suitable for use in association with the present invention include three generally-known modeling approaches, or modified versions of such modeling programs. These suitable modeling approaches, represented by SEDNORM [Cohen and Ward, 1991; *Computers and Geoscience*, v. 17, p. 1235-1253], LPNORM [De Caritat, et al., 1994; *Computers and Geoscience*, v. 20, p. 313-347], and the modeling system MODAN [Paktunc, 1998; *Computers and Geoscience*, v. 24, p. 425-431], use a best-fit solution to a series of linear equations. Additionally, the systems 20 used herein may be divided into at least one central data processing facility and one or more remote and/or local user facilities, typically linked by encrypted network connections or similar links. The architecture of system 20 may be based on a shared processing functionality between remote or local user facilities and a central location, such as a company centralized location. The remote or local user facilities may also include a Web user or Internet user who requests information or interacts with the system 20.

As used herein, the term "neural network" refers to a type of artificial intelligence that attempts to imitate the way a human brain works and functions. Rather than using a digital model, in which all computations manipulate zeros and ones, a neural network works by creating connections between processing elements. Neural networks may be particularly effective in predicting and generating compositional algorithms and models when the network has a large database of prior examples or data point values to draw upon. While a neural network may imply a non-digital computer, in accordance with the present invention, neural networks may also be simulated on digital computers, as known in the art.

Similarly, as used herein, the term "expert system" broadly refers to computer applications and systems capable of performing tasks that would otherwise be performed by a human expert. Some expert systems are designed to take the place of human experts, while others are designed to aid them, both of which are contemplated by the present invention. Expert systems are part of a general category of computer applications known as artificial intelligence, as suggested above. Expert systems are meant to solve real problems which normally would require a specialized human expert (such as a doctor or a mineralogist). Building an expert system therefore first involves extracting the relevant knowledge from the human expert. Such knowledge is often heuristic in nature, based on useful "rules of thumb" rather than absolute certainties. Extracting it from the expert in a way that can be used by a computer is generally a difficult task, requiring its own expertise. A knowledge engineer has the job of extracting this knowledge and building the expert system knowledge base.

Expert systems in accordance with the present invention may be of any type, especially those which are iterative in nature, in that they were developed from and written in a manner which facilitates easy inspection and modification. Such systems will be able to explain their reasoning (to expert, user and knowledge engineer) and answer questions about the solution process. Such expert systems will also be capable of being readily updatable, without having to rewriting large portions of code; rather, the systems will be capable of adding or deleting localized chunks of knowledge.

The most widely used knowledge representation scheme for expert systems is rules (sometimes in combination with frame systems). Typically, the rules won't have certain conclusions—there will just be some degree of certainty that the conclusion will hold if the conditions hold. Statistical techniques may also be used by expert systems herein, in order to determine such certainties, and/or to generate and define algorithms. Rule-based systems, with or without certainties, are generally easily modifiable and make it easy to provide reasonably helpful traces of the system's reasoning.

As described briefly above, the artificial intelligence system 20 can use algorithms or a series of algorithms to develop and generate the ternary diagrams that act as the primary vehicle for lithology and mineralogy model development in determining or estimating the general lithology, specific lithology and mineralogy of a rock or rock formation. Optionally and equally acceptable, previously generated ternary diagrams can be used by an algorithm or a series of algorithms to develop and generate lithology, mineralogy, or both lithology and mineralogy compositional models for use in evaluating a subterranean formation surrounding a wellbore. Generally, the artificial intelligence system (20) utilizes the weight percent of major element oxides—specifically, $SiO_2$, $K_2O$, MgO, CaO, $Fe_2O_3$, and $Al_2O_3$,—and the elements, carbon (C), sulfur (S), thorium (Th), and uranium (U) plotted on ternary discrimination diagrams to distinguish between siliciclastic, evaporitic, and carbonate lithologies, among others. In accordance with one aspect of the present invention, aluminum elemental data is not emphasized in accordance with the methods described herein. However, its use and inclusion in lithology and mineralogy discrimination determinations can be contemplated in specific instances, as appropriate and depending upon the subterranean environment being evaluated.

In example of the utility of the ternary diagram, and owing to the importance of the ternary diagram in developing the models for use with the methods of the present invention, a brief explanation of their use, as well as their expansion into hybrid ternary diagrams, is now provided. In example, elemental percentages of a rock having a given composition of about 5% CaO, about 4% MgO, and about 80% $SiO_2$ will be normalized using the system 20, and then plotted on a ternary diagram, chemical discriminatory diagram, or a similar type of diagram. The exemplary normalizations for this example are as follows:

$$CaO\ \%=6\%=(CaO/\Sigma(CaO, MgO, SiO_2))\times(100)$$

$$MgO\ \%=4\%=(MgO/\Sigma(CaO, MgO, SiO_2))\times(100)$$

$$SiO_2\%=90\%=(SiO_2/\Sigma(CaO, MgO, SiO_2))\times(100)$$

Figure 3:
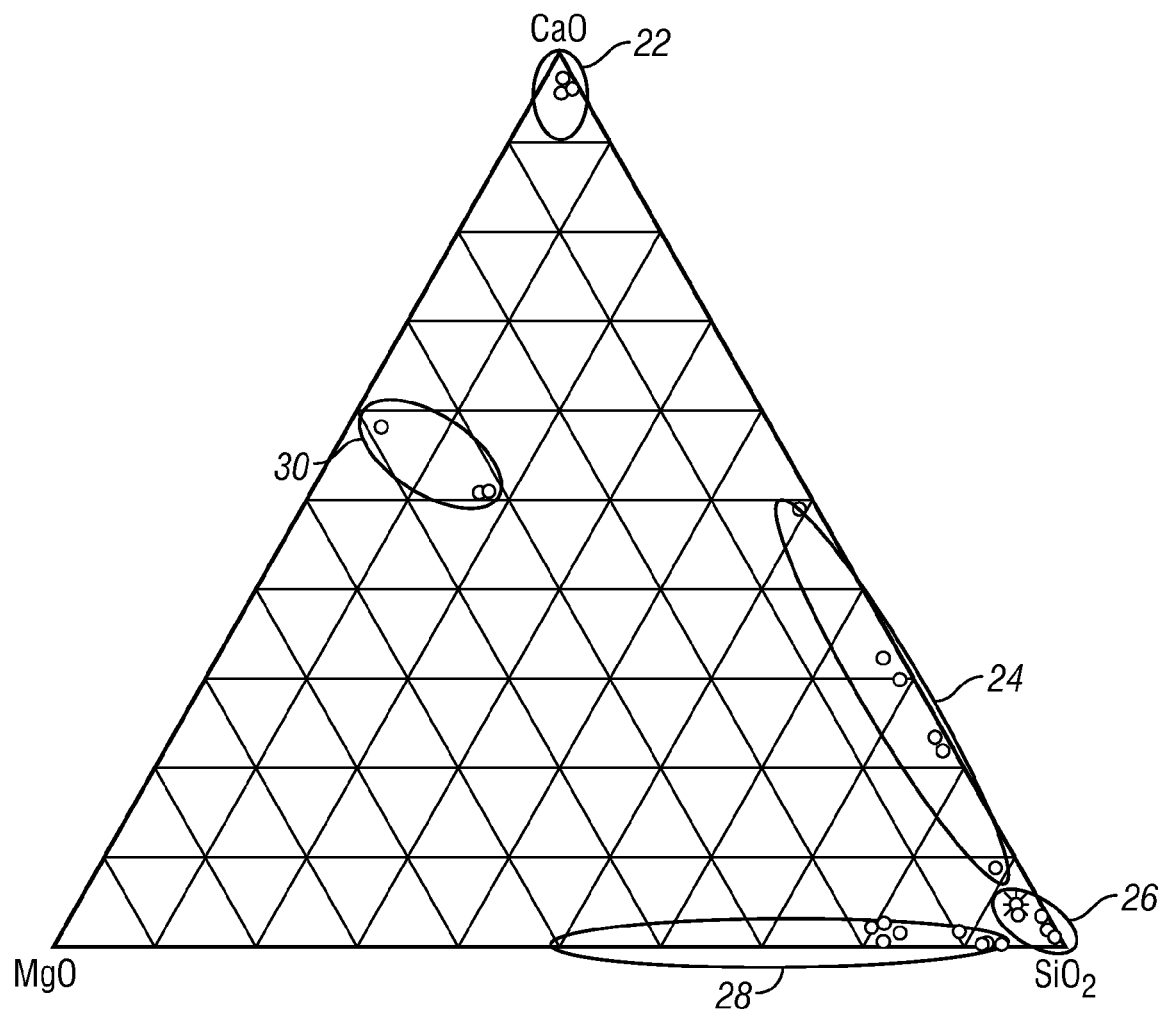
FIG. 3 illustrates a ternary diagram showing the intersection of guidelines for normalized values of $SiO_2$, $MgO$, and $CaO$.

The position of this point is then plotted on a standard ternary diagram based on the three variables denoted by the intersection of the mark "*" on FIG. 3. According to the point defined by this relationship, the expert system would generate the ternary diagram (or equivalent) and plot the above chemistry in the zone shown on the ternary diagram as a "sandstone".

Referring to FIG. 3 in more detail, the zones outlined on the general ternary illustrate the range of compositions for different lithologies that can be identified using this approach. The zones outlined on the ternary illustrate the range of compositions for different lithologies that can be identified using this approach. Near the $SiO_2$ apex 26 of the ternary, for example, sandstones can be outlined. Between $SiO_2$ and CaO, sandstones having variable amounts of carbonate content 24 can be identified, while limestone compositions can be determined near the CaO apex 22 along with the silicon content. CaO and MgO can be used to identify dolostone 30, and points between the dolostone composition and CaO can be used to define the relative proportion of calcite versus dolostone in a carbonate. In addition, ratios between $SiO_2$ and $MgO+Fe_2O_3$ 28 can be used in further defining shale lithology, as described in more detail below.

FIG. 4 illustrates an exemplary hybrid ternary group for use by the expert system of the present invention in determining the specific lithology of rock formations. Studies of chemistry and quantitative mineralogy information from lithic, feldspathic, and quartzose sandstones have led to the conclusion that the $Fe_2O_3$ and $K_2O$ ratio versus the actual $SiO_2$ value of the rock is applicable for discriminating between specific siliciclastic lithologies, as has been supported by the work of Moore, et al. [*J. Sedimentary Petrology*, vol. 40: pp. 1147-1152 (1970)] and Wendlandt, et al. [*American Association of Petroleum Geologist Bulletin*, vol. 74: pp. 837-856 (1990)]. However, due to difficulties associated with exploring such detailed relationships with a standard ternary diagram due to normalization of values resulting in loss of resolution over the detailed chemistry of the rock, hybrid ternaries such as the hybrid ternary group 30 illustrated in FIG. 4 were developed for use in association with the present invention. The hybrid ternary group 30 illustrated in FIG. 4 use the normalized ratio between $Fe_2O_3$ and $K_2O$ versus the actual silicon or calcium content (determined as their oxides) in order to determine the specific lithology of sandstones. Using this approach, and looking specifically at plot A in FIG. 4, quartzose 32 can be clearly distinguished from dolostones 31 and carbonates 33. Similarly, looking at plot C, quartzose 32 can also be clearly distinguished from feldspathic sandstones 34 and lithic sandstones 36. The bottom normalized ratio between $K_2O$ and MgO of plot B versus the actual silicon ($SiO_2$) content allows for the determination of carbonates 33, and their distinction from feldspathic sandstones 34 and lithic sandstones 36. Turning to the central hybrid ternary diagrams C and D of FIG. 4, the normalized ratio between $K_2O$ and $SiO_2$ versus either $Fe_2O_3$ (diagram C) or MgO (diagram D) is illustrated. As illustrated in diagram C, the hybrid diagram allows for the differentiation of shales that are iron rich (35) from shales that are magnesium rich (38), while diagram D illustrates the determination of magnesium-rich shale (38) from dolostones (31). Finally, in the third set of hybrid ternary diagrams, referring specifically to diagrams E and F, feldspathic sandstones 34, carbonates 33, dolostones 31, and limey sandstones 37 can be differentiated by plotting a normalized ratio of $K_2O$ and either MgO or $Fe_2O_3$ versus the actual calcium oxide (CaO) content. For example, in diagram E, feldspathic sandstones 34 can be distinguished from limey sandstones 37 and carbonates 33, while in diagram F, dolostones 31, carbonates 33, feldspathic sandstones 34, and limey sandstones 37 can all be clearly distinguished. In this manner, the sandstones can be discriminated, using the expert system and methods of the present invention, into quartzose, feldspathic, and lithic sandstone specific lithology classifications.

Using both general and hybrid ternary diagrams, the expert system can be further developed for use in distinguishing between various lithologies, and thereby allowing for the determination of both the general lithology and specific lithology of a rock formation surrounding a wellbore, as well as for determining the mineralogy of a rock formation surrounding a wellbore.

Lithology Determination

The present disclosure is directed generally to the use of wellbore data to determine the lithology and mineralogy of formations surrounding a subterranean borehole. In this regard, the meaning of the terms "mineralogy" and "lithology", as well as the characteristics of these descriptors of rocks, is necessarily outlined for the purposes of the present disclosure. Minerals are known to be naturally occurring homogeneous inorganic solids, composed of one or more chemical elements whose internal orderly arrangement forms a geometric crystal lattice. The three main mechanisms of their formation are precipitation from solution, solidification due to cooling of magmas, and sublimation from vapor [Palache, C; Berman, H; and Frondel, C; *The System of Mineralogy of James Dwight Dana and Edward Salisbury Dana;* 1951]. Differences in chemical bonding during formation from these processes produce minerals that possess definite physical and chemical properties. Several of the traits of notable importance in determining differences include, but are not limited to, cleavage, fracture, hardness, and specific gravity. "Cleavage," as used herein, refers to a physical trait of many minerals, and is a measure of the tendency of a mineral to break along planes of weak bonding. Conversely, "fracture", as used herein, refers to a physical property exhibited by minerals whose bonds are strong along all crystallographic planes [Dana, 1951, id.]. A term related to fracture, and often used in conjunction with the term fracture in classifying or describing minerals, is the term tenacity, which is the resistance that a mineral offers to breaking, crushing, bending, cutting, or other acts of destruction. Tenacity and fracture are related in that the "fracture" of a mineral (or rock) is how the mineral breaks once the tenacious limit has been exceeded. In example, quartz is the most abundant and hardest common mineral found in sedimentary rocks. Quartz exhibits "conchoidal fracture" [Dana, J. D.; *A System of Mineralogy* (6$^{th}$ Ed.): New York, Wiley; Rewritten by E. S. Dana (1915)]. An attempt to cleave this covalently-bonded mineral causes the crystal to shatter in a manner similar to glass. In contrast, the mineral "calcite" exhibits rhombohedral cleavage in three directions, two of which are perpendicular to one another. Feldspars, common sedimentary minerals, also possess two directions of cleavage, oriented approximately 90° to each other.

Hardness and specific gravity are other important physical properties of minerals. Hardness is a measure of a mineral's resistance to scratching or abrasion, usually represented on a scale ranging from 0 to 10, the scale being known as Moh's relative hardness scale, while specific gravity (often abbreviated s.g.) is a comparison of a mineral (including metallic minerals) or rock material's weight with the weight of an equal volume of water, and is measured in terms of grams per cubic centimeter, g/cc. As used herein, the term "specific gravity" is equivalent to the density of a mineral. Quartz, for example, has a relative scratch hardness (Mohs hardness=7), substantially greater than that of calcite (Mohs hardness=3) [Dana, J. D.; *A System of Mineralogy* ($6^{th}$ Ed.): New York, Wiley; Rewritten by E. S. Dana (1959)]. This would indicate that a quartz grain will survive abrasion during transport more readily than will calcite.

Sedimentary rocks, in contrast to pure minerals, consist of accumulations of minerals, either as grains or rock fragments, resulting from erosion, sedimentation, and precipitation which is associated with alluvial, fluvial, Aeolian and marine processes. The term "lithology" as related to these sedimentary rocks describes the physical attributes of the rock, including the grain size and texture of the minerals and fragments comprising the rock. Therefore, a "rock", in contrast to a "mineral", may be defined as a heterogeneous solid which is composed of one or more minerals whose mineral types, grain sizes, and textures determine its lithology. In the case of rocks composed of silicate minerals, or siliciclastics, the grain sizes and texture will define whether the rock is a shale, siltstone, or sandstone [Folk, R. L., in *The Petrology of Sedimentary Rocks: Austin, Tex.*, Hemphill Publishing Co., (1974)]. Carbonate lithologies, which are predominantly composed of calcite and dolostone, are also classified according to grain size [Dunham, R. J., "Classification of Carbonate Rocks According to Depositional Texture," in Ham, W. E. ed., *Classification of Carbonate Rocks: American Association of Petroleum Geologists Memoir* 1, pp. 108-121 (1962)].

Minerals that compose lithologies, such as sandstones, can include bulk sand sized assemblages of quartz, feldspar, and mica with minor clay. Shales, on the other hand, are composed of predominately silt and clay sized minerals such as quartz and feldspar with abundant clay minerals such as kaolinite, illite, and smectite. Carbonates can also include siliciclastic minerals and rock fragments along with other chemical mineral precipitants such as anhydrite and gypsum. These mineralogical generalizations however are complicated by the formation of other minerals through diagenesis and metasomatism within the matrix. Therefore, the term "shale" is not comparable to the term "clay mineral" used to describe illite, smectite or kaolinite, nor can "sandstone" be used as an equivalent term for minerals such as quartz, feldspars or other silicates. One term describes lithology while the other describes mineralogy.

These distinctions have not always been made clear in the well logging industry. Lithology and mineralogy terms have often been used interchangeably to describe the same entity, which can often lead to misinterpretations concerning the true meaning of the terms. For example, the usage of the lithology term "sand" and the mineral term "quartz" together for describing a rock is not compatible. A "sand" does not possess the physical traits as described previously for minerals, nor are the physical and chemical properties of "quartz" bounded by any grain size distinction inclusive of "sand".

Consequently, in the current patent application, the terms "lithology", and "specific lithology" are used to describe the chemistry associated with a composite mineral matrix. Similarly, the term "mineralogy", as used herein, is meant to describe and quantify the minerals composing those lithology matrices. These distinctions are in sharp contrast to other current quantitative methods, wherein the chemistry is used to determine the quantitative lithology where individual silicate, carbonate and clay minerals are not segregated based on the chemistry, but instead are represented by assemblages of silicate, carbonate and clay groups.

As used herein, the term "general lithology" refers to the bulk lithology of a rock (a heterogeneous solid which is composed of one or more minerals), without regard to specific type. General lithologies that can be determined according to the methods of the present invention include, but are not limited to, sands (such as sandstones), shales, carbonates, coal, and evaporites. These general lithologies in turn can be used to determine the "specific lithology", which as used herein refers to the more particular, definitive lithology of a formation. Sands include but are not limited to the specific lithologies quartzose sands (sands containing predominantly quartz, with minor quantities of other minerals), feldspathic sandstones, lithic sands, limey sands, and shaley sands. Shales include sandy shale, magnesium-rich (Mg-rich) shale, and iron-rich (Fe-rich) shale. Carbonates include limestone and dolostones. Evaporites that can be determined include but are not limited to salts and anhydrites.

Figure 5:
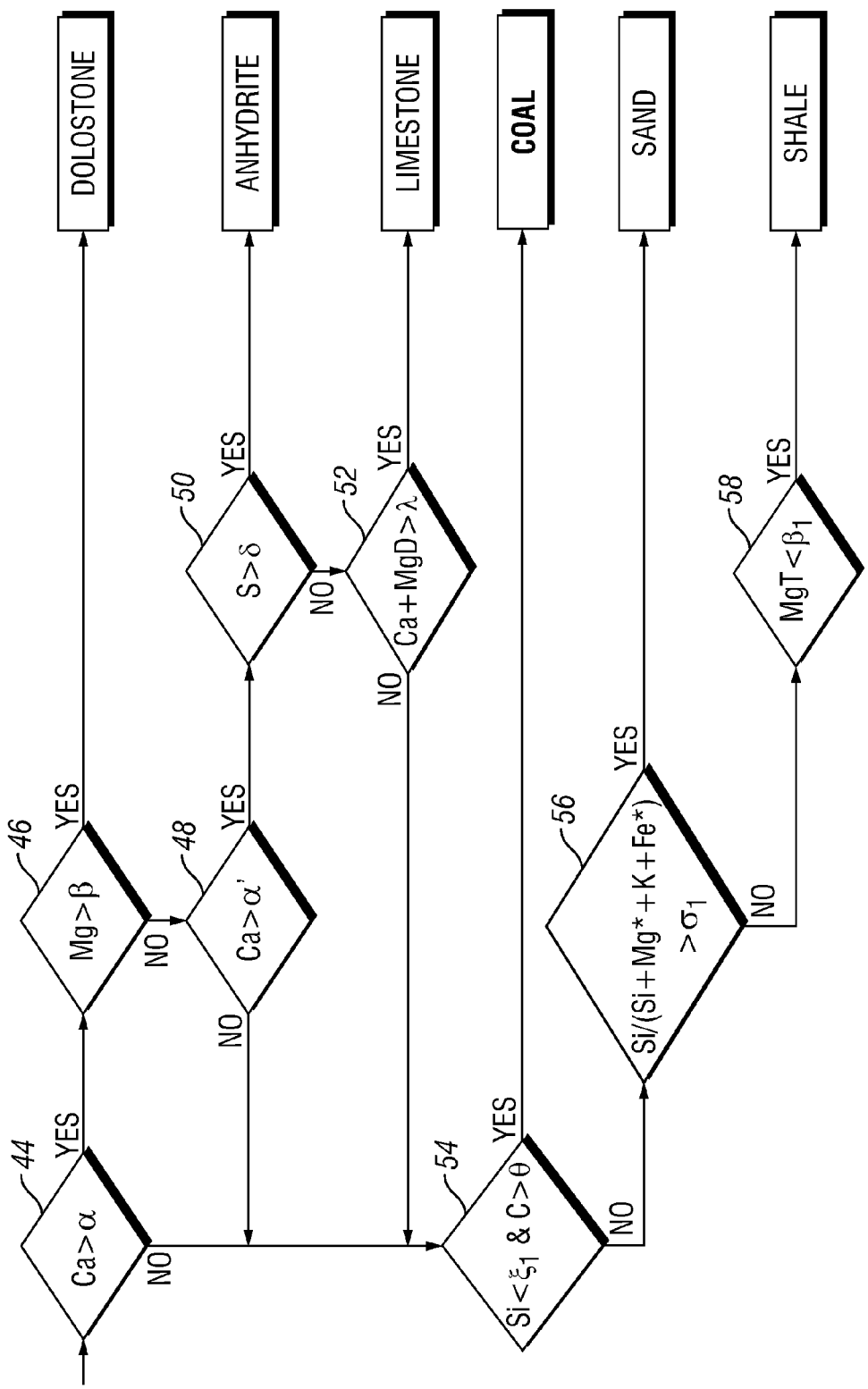
FIG. 5 illustrates a flow chart showing expert system logic for determining general lithology.

Referring now to FIG. 5, a flow diagram illustrating an exemplary artificial intelligence system logic flow chart (obtained using an expert system) for determining the general lithologies of a subterranean formation is shown. With respect to this figure, and other figures described herein illustrating general flow diagrams, all elements that are listed refer to the elemental oxides (e.g., "Ca" means CaO), unless specified otherwise. The exceptions to this are the elements sulfur (S) and carbon (C), which as used herein refers to the element, and not the oxide. Additionally, in referring to the flow diagrams herein, it should be noted that the choice of values included are not necessarily limited, and that the choice of values for specific discriminators or elemental-oxide values can affect all of the other values throughout the system computations. That is, it should be realized that while changes can be made to values within the flow diagram of FIG. 5, these values may necessitate changes in the subsequent decision prompts and value computations throughout the analysis in order to obtain meaningful results. Finally, with respect to FIG. 5 and subsequent figures, the values and logic flow charts are meant to be exemplary only, as are the references to the use of an expert system to perform the evaluations, and are not meant to limit the present disclosure in any manner.

Prior to the determination of the general lithologies as outlined in FIG. 5, and in order to more accurately differentiate between clay-containing and non-clay-containing lithologies, the artificial intelligence system optionally first determines the amount of magnesium that is associated with clay, and not associated with carbonates, by comparing the amount of magnesium oxide with the amount of potassium oxide, using the ratio of potassium oxide-to-magnesium oxide (K/Mg) of K-feldspar/illite on the ternary diagram illustrated in FIG. 4. This value is assigned to the amount of magnesium oxide, MgO (represented herein by Mg*). Similarly, the artificial intelligence system can also optionally and alternatively first determine the amount of iron oxide that is associated with clay and not associated with carbonates and other iron-oxides and iron-containing minerals. This is determined by a computational evaluation of the allowable ratio of potassium oxide-to-iron oxide ($K_2O/Fe_2O_3$) of K-feldspar/chlorite. This value is assigned to $Fe^*$.

Returning now to FIG. 5, a series of "if" and "then" statements coupled with percentages of certain elements from the ternary diagram and/or hybrid ternary diagram are presented, and initiate a path for sorting through the multitude of possible general lithology determination factors. In this flow chart, as well as others described herein, a siliciclastic discriminator, such as the $SiO_2/(SiO_2+K_2O+Mg^*+Fe^*)$ ratio, also designated as "SS", plays a significant role in directing the course of the methods and process. It should be noted, however, that while this siliciclastic discriminator is sometimes most useful in segregating siliciclastic sandstone lithologies versus carbonates (limestone and dolostone) and shales, the artificial intelligence system 20 used for the methods and processes described herein was developed with the possibility that the MgO and/or $Fe_2O_3$ chemistry of the rock formations may not all be attributed to silicate minerals. Consequently, in such instances, the primary general lithology ratio is adjusted according to the excess contributed by carbonate, oxide, and sulfide phases.

As an example of operation of FIG. 5 to determine the general lithology of a rock or subterranean rock formation, the artificial intelligence system first differentiates between carbonates/anhydrites and sands and shales by evaluating the amount of calcium in the rock at decision prompt 44, which is determined from the CaO (Ca) value based on the ternary diagrams illustrated in FIG. 3 and FIG. 4. If the computed CaO (Ca) value is greater than a (wherein a ranges from about 10 wt. % to about 16 wt. %), shales, sands and coal are excluded and the magnesium oxide value (Mg, as determined from MgO in the ternary diagrams) will be used to distinguish the rock between a dolostone and an anhydrite or a limestone. At decision prompt 46, the magnesium oxide value (Mg) is computed by the artificial intelligence system, and evaluated. If Mg is greater than β (wherein β ranges from about 5 wt. % to about 11 wt. %), then the system classifies the rock as a dolostone. If, however, Mg is computed and determined to be less than β, then the calcium oxide value (Ca) will be used to further evaluate the rock. At decision prompt 48, if the second calcium oxide value (Ca) is computed to be greater than α', (wherein a' ranges from about 15 wt. % to about 22 wt. %), then the system proceeds to decision prompt 50 to evaluate the elemental sulfur content (S) in order to further classify the rock's general lithology. If the computed value of S is greater than δ (wherein δ ranges from about 5 wt. % to about 23 wt. %, including about 11 wt. %), then the rock is determined to have the anhydrite general lithology. If the computed S is less than δ, however, then the magnesium content of the rock that is associated with limestone should be evaluated. At decision prompt 52, the artificial intelligence system computes and evaluates the additive value of the calcium oxide content (Ca, based on the CaO ternary value) and the magnesium oxide from dolostone value (MgD). If the computed value of Ca+MgD is greater than λ (wherein λ ranges from about 15 wt. % to about 40 wt. %), then the rock is found to have a limestone general lithology. If the computed value of Ca+MgD is determined to be less than λ at decision prompt 52, then the carbonate and anhydrite general lithologies are excluded, and the system must proceed to decision prompt 54 to determine whether the rock is a shale, a sandstone, or coal.

In continued reference to FIG. 5, if by computation and evaluation the artificial intelligence system has excluded the carbonates and anhydrite general lithologies, the system then attempts to differentiate between coal, sand, and shale general lithologies. At decision prompt 54, the artificial intelligence system computes and evaluates the silicon oxide value (Si) and the elemental carbon value (C). If the rock is determined to have a Si value less than $\xi_1$ (wherein $\xi_1$ ranges between 10 wt. % and 40 wt. %) and an elemental carbon value (C) greater than θ (wherein θ ranges between 40 wt. % and 100 wt. %), then the system classifies the rock as a coal. However, if either of these two requirements is not met, the system will use the ratio of $Si/(Si+Mg^*+K^+ Fe^*)$ at decision prompt 56 to evaluate the general lithology of the rock formation. If the computed ratio of $Si/(Si+Mg^*+K^+ Fe^*)$ is greater than σ (wherein σ ranges from about 0.6 to about 1.0), then the expert system determines that the rock has a sandstone general lithology. In contrast, if the ratio of $Si/(Si+Mg^*+K^+ Fe^*)$ is computed to be less than σ, then the rock is determined to be shale. In order to further differentiate the shale, at decision prompt 58 the system 20 computes and evaluate the magnesium oxide ternary value (MgT), in order to determine if the rock is a shale. If the MgT value has a computed value less than $\beta_1$ (wherein $\beta_1$ ranges from about 0.1 to about 0.4), then the rock is determined to be a shale; conversely, if the MgT is evaluated and by computation found to be greater than $\beta_1$, then the shale general lithology will be excluded, and the general lithology of the rock will be undetermined.

Once the general lithologies of a subterranean formation surrounding a wellbore have been determined, the data can be provided as output to a customer, as suggested above, or can be used to further generate a second compositional model which describes the specific geology of the subterranean formation surrounding the wellbore. Exemplary logic flow diagrams illustrative of the general processes for determining the specific lithology of a formation, as utilized by an artificial intelligence system (such as an expert system) as described herein, are shown in FIGS. 6-10.

Figure 6:
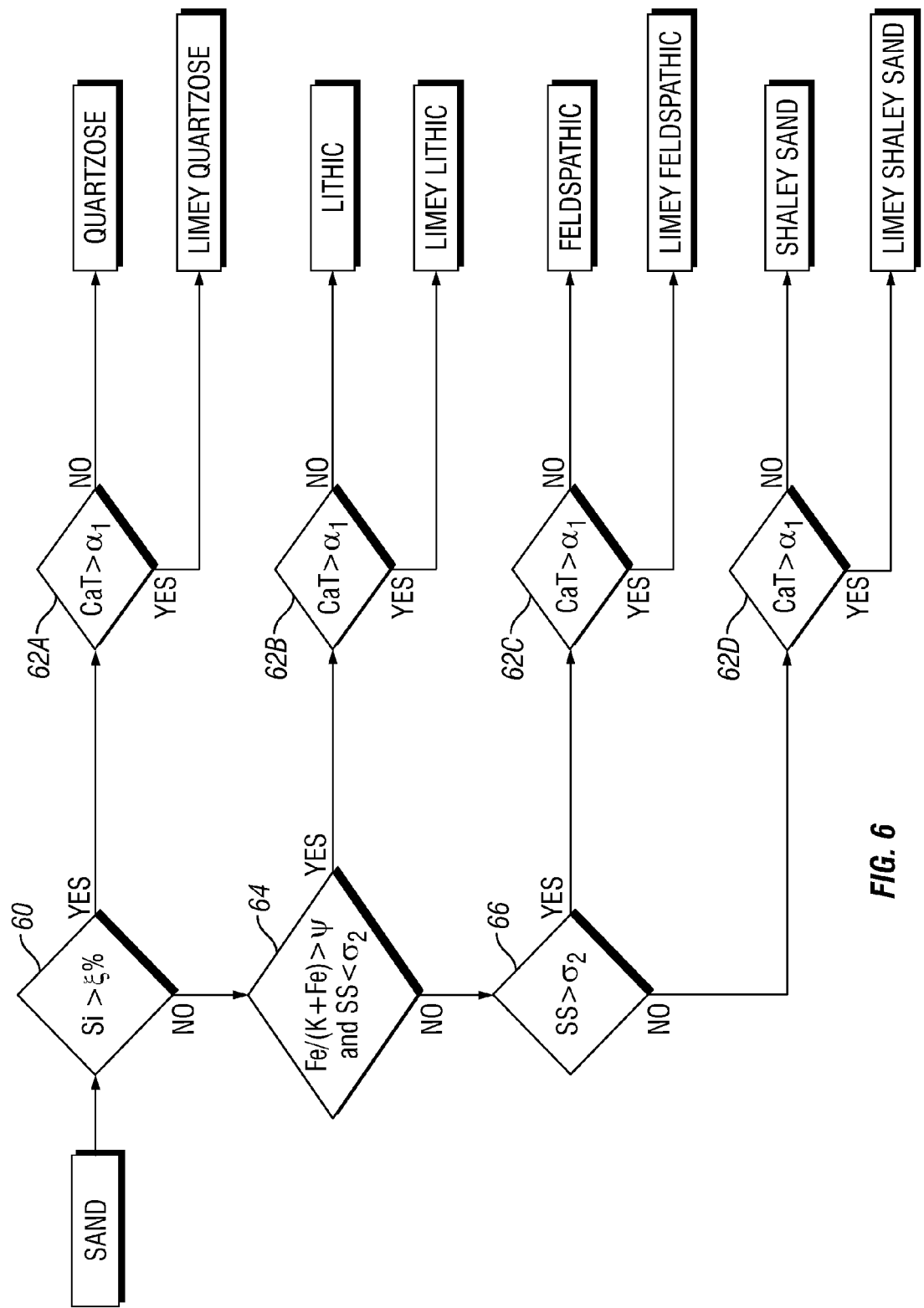
FIG. 6 illustrates a flow chart showing expert system logic to define specific sandstone lithologies.

FIG. 6 illustrates a flow chart showing artificial intelligence system logic for determining specific lithology for sandstones. To differentiate between the different types of specific sandstone lithologies, the artificial intelligence system first calculates the relative average weight percent (ξ%) of silicon oxide (Si) in the formation at decision prompt 60. If the relative average weight percent of silicon oxide is greater than ξ (wherein ξ ranges from about 70 wt. % to about 100 wt. %), then the system is determined to be a quartzose sandstone, and the lithic, feldspathic, and shaley sandstone specific lithologies are excluded from consideration. At the next decision prompt, decision prompt 62a, the system (20) then computes and evaluates the Ca oxide ternary value (CaT), which is determined by the system using a CaO—$SiO_2$—MgO ternary diagram. If the CaT value is found to be greater than $\alpha_1$ (wherein $\alpha_1$ ranges from about 0.01 to about 0.15), then quartzose is excluded as an option, and the specific lithology of the rock is determined to be limey quartzose. Conversely, if at decision prompt 62a the CaT value is found to be less than $\alpha_1$, then the rock is determined to be quartzose.

Continuing to refer to FIG. 6, if at decision prompt 60 the relative average weight percent (wt. %) of silicon oxide (Si) is less than $\alpha_1$ then quartzose is excluded from consideration in determining the specific lithology of the sandstone, and lithic, feldspathic, and shaley sandstones are considered by the system. At decision prompt 64, the system evaluates the ratio of $Fe_2O_3/(K_2O+Fe_2O_3)$ [represented as the $Fe^*/(K+Fe^*)$ ratio] and the siliciclastic discriminator (SS). If the ratio of $Fe^*/(K+Fe^*)$ is greater than ψ (wherein ψ range from about 0.3 to about 0.7), and the siliciclastic discriminator (SS) value is less than $\sigma_1$ (wherein $\sigma_1$ ranges from about 0.85 to about 0.95), then the artificial intelligence system classifies the rock as a lithic sandstone, and excludes feldspathic and shaley sandstones as potential specific lithologies. In this instance, the calcium oxide ternary value (CaT) is then evaluated by computation at decision point 62b; if CaT is found to be greater than $\alpha_1$, then the system (20) classifies the rock as limey lithic sandstone. If, however, the calcium oxide ternary value (CaT) at decision prompt 62b is found to be less than $\alpha_1$, then the artificial intelligence system classifies the rock as lithic sandstone. Following the flowchart of FIG. 6 and returning to decision prompt 64, if after computation and evaluation both requirements are not met, then the system proceeds to decision prompt 66. At decision prompt 66 the system evaluates the siliciclastic (sand-shale) discriminator (SS) to determine if it is greater than $\sigma_2$ (wherein $\sigma_2$ ranges from about 0.85 to about 0.95). The SS value is computed and evaluated, and if found to be greater than $\sigma_2$, then the artificial intelligence system classifies the rock as feldspathic sandstone, and proceeds to decision prompt 62c. If the CaT at decision prompt 62c is found to be greater than $\alpha_1$ after computation and evaluation, then the rock is classified as having a limey feldspathic sandstone; conversely, when CaT is less than $\alpha_1$ at decision prompt 62c, the rock is determined to have a feldspathic specific lithology. Alternatively, if SS is found to be less than $\sigma_2$, then feldspathic sandstones are excluded as a specific lithology, and the artificial intelligence system classifies the sandstones as shaley sandstones and proceeds to decision prompt 62d. If the calcium oxide ternary value (CaT) at decision prompt 62d is found to be greater than $\alpha_1$, after computation and evaluation, then the rock is classified as having a limey shaley sand specific lithology; otherwise, when CaT is less than $\alpha_1$ prompt 62d, the rock is classified as having a shaley sand specific lithology.

Figure 7:
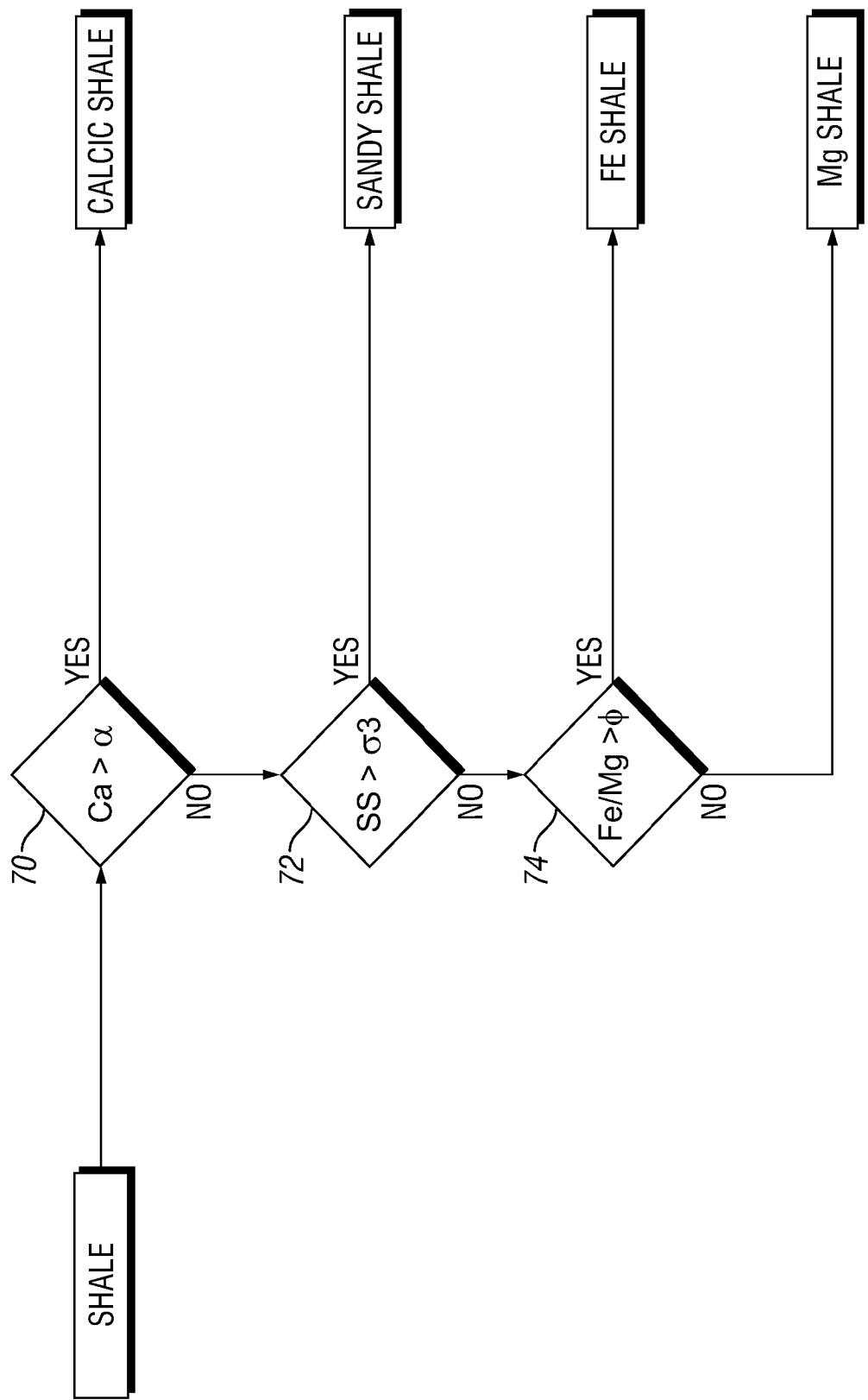
FIG. 7 illustrates a flow chart showing expert system logic to define specific shale lithologies.

FIG. 7 illustrates a flow chart showing exemplary artificial intelligence system logic for determining the specific lithology for shales, using, for example, an expert system in accordance with aspects of the present disclosure. As illustrated therein, having been determined by the artificial intelligence system to have a general lithology classification of a shale, the elemental data from the rock is then further evaluated by the system to differentiate the various specific lithologies of shales-calcic shales, sandy shales, iron shales, and magnesium shales. In an example of operation, the system first evaluates the amount of calcium oxide (CaO) present in the rock at decision prompt 70. If the amount of CaO (Ca) is computed to be greater than $\alpha'$ (wherein $\alpha'$ ranges from about 10 wt. % to about 25 wt. %), then the sandy, iron-rich and magnesium-rich shales are excluded, and the rock is determined to have a calcic shale specific lithology. Conversely, if after computation and evaluation at decision prompt 70 the amount of calcium oxide is computed to not be greater than $\alpha$, then the artificial intelligence system proceeds to evaluate the siliciclastic discriminator ratio (SS) value at decision prompt 72. If SS ratio value is computed to be greater than $\sigma_3$ (wherein $\sigma_3$ ranges from about 0.7 to about 1.0), then the rock is determined by the artificial intelligence system to have a sandy shale specific lithology. If SS is less than $\sigma_3$, however, then the sandy shale specific lithology is excluded, and the system proceeds to decision prompt 74, where the ratio of iron oxide (Fe) to magnesium oxide (Mg), (Fe/Mg), is computed and evaluated. If the Fe/Mg ratio is a value greater than $\phi$ (wherein $\phi$ ranges from about 1.5 to about 8.0), then the artificial intelligence system determines that the rock has an iron-rich shale specific lithology; if the Fe/Mg ratio is less than $\phi$, then the system excludes the iron-rich shale specific lithology, and classifies the rock as having a magnesium-rich specific lithology.

Figure 8A:
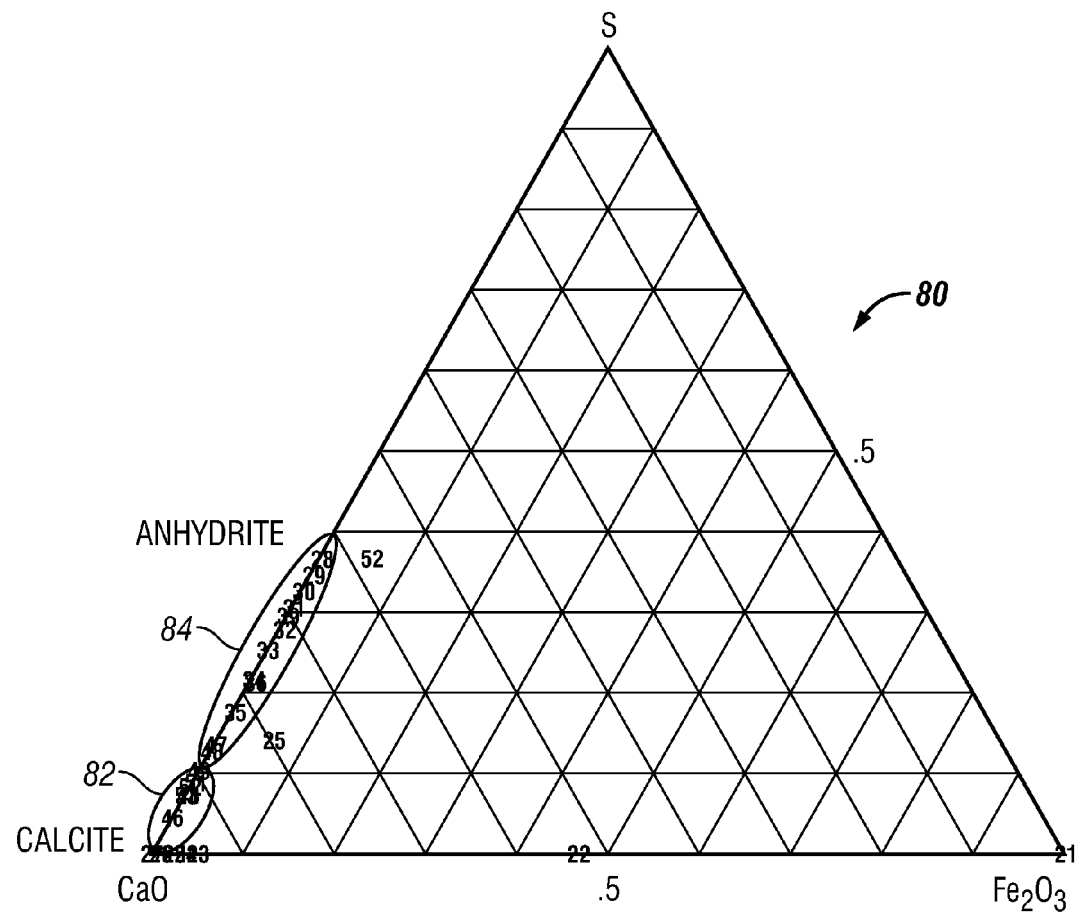
FIG. 8A illustrates a ternary diagram showing the intersection of guidelines for normalized values of S, CaO, and $Fe_2O_3$.
Figure 8B:
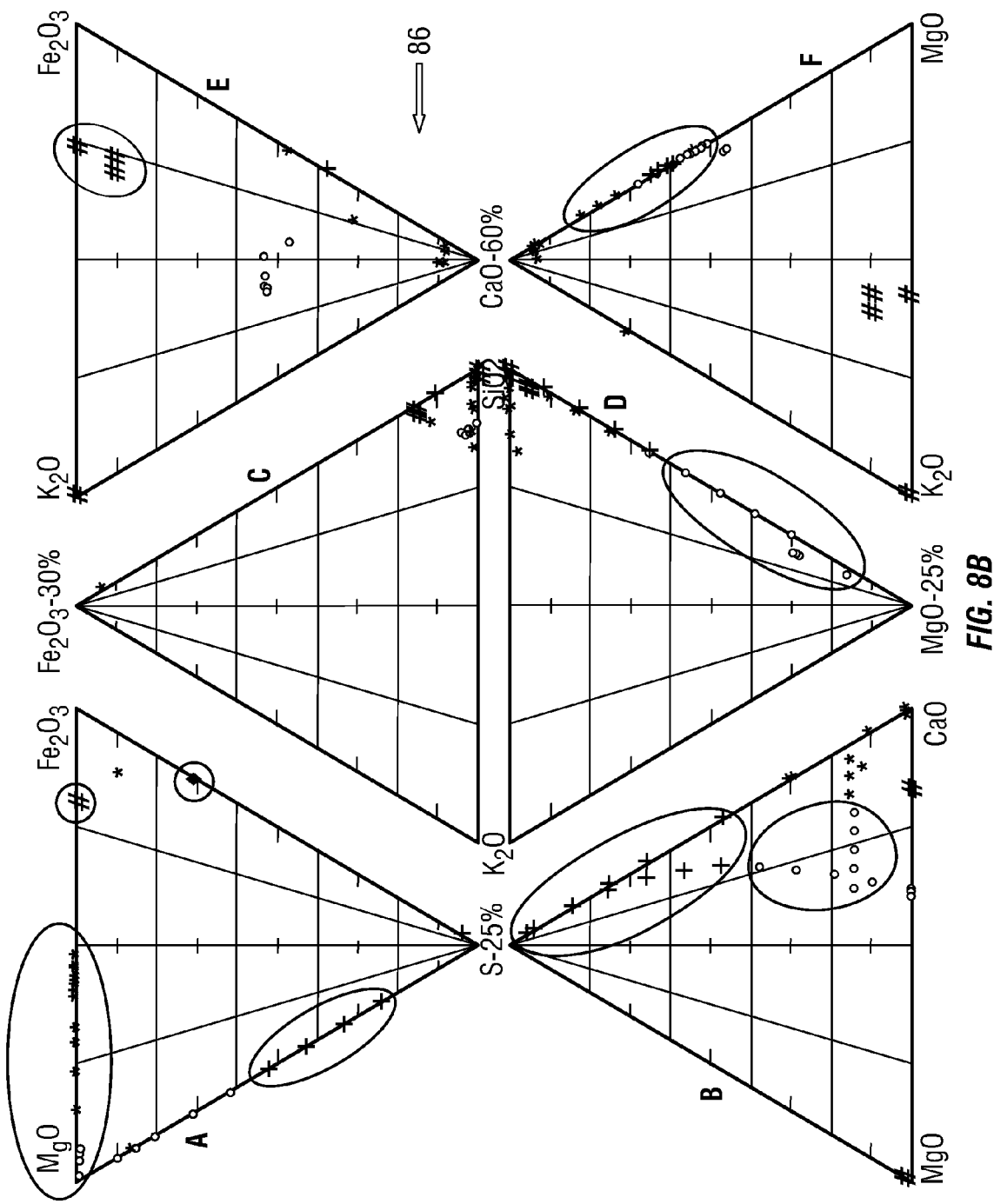
FIG. 8B illustrates a set of hybrid ternary diagrams used to develop an expert system for carbonate, anhydrite, and dolostone lithologies.

In FIGS. 8A and 8B illustrate an exemplary ternary diagram and exemplary hybrid ternary diagrams, respectively, used to determine the range of compositions and specific lithologies for anhydrites, limestones, and dolostones classified according to the present methods. In FIG. 8A, ternary diagram 80 represents limestones 82 and anhydrites 84, based on the ratios between CaO, $Fe_2O_3$, and S. Rocks which plot in the region of area 82 can be considered to have a calcite specific lithology, and those within region 84 can be considered to have an anhydrite specific lithology.

Turning to FIG. 8B, similar to the previous discussions concerning the set of hybrid ternaries of FIG. 4, due to potential difficulties associated with attempting to discriminate specific lithologies using traditional ternary diagrams and the associated loss of resolution over the detailed chemistry of the rock resultant from normalization of values, a set of hybrid ternary diagrams 86 using normalized ratios are illustrated. In ternary plot A, the normalized ratio between MgO and $Fe_2O_3$ against the actual sulfur value is shown, and allows for the differentiation between anhydrite (+), calcite(*), dolostone (●), sand (#) and pyrite (◆) specific lithologies. Ternary plot B, in a similar fashion, illustrates the normalized ratio between MgO and CaO against the actual sulfur value (S), allowing for the differentiation between anhydritic calcites (+) and dolostones (●). In ternary plot C, the ratio of $K_2O$ to silicon oxide ($SiO_2$) against the actual $Fe_2O_3$ value is illustrated, allowing for the artificial intelligence system to distinguish between iron-rich calcite (*) and dolostones (●). Ternary plot D illustrates the normalized ratio of $K_2O$ to silicon oxide ($SiO_2$) against the actual amount of magnesium (as the magnesium oxide, MgO). The information provided by this plot allows the artificial intelligence system to distinguish between dolostones (●) versus anhydrites (+) and/or calcites (*). In ternary plot E, the normalized ratio between $K_2O$ and $Fe_2O_3$ against the value of actual calcium (as the calcium oxide, CaO) in the system is illustrated. This plot allows for the differentiation of sand (#) and dolostone (●) from calcite (*). Finally, ternary plot F illustrates the normalized ratio between $K_2O$ and MgO against the value of actual calcium (as the calcium oxide, CaO) in the system, allowing for the system to distinguish between sands (#), calcites (*), and dolostones (●). All of these ternary plots, A-F, can be utilized by the artificial intelligence system, alone or in combinations, in order to determine the specific lithology of anhydrites, dolostones, and evaporites.

Figure 9:
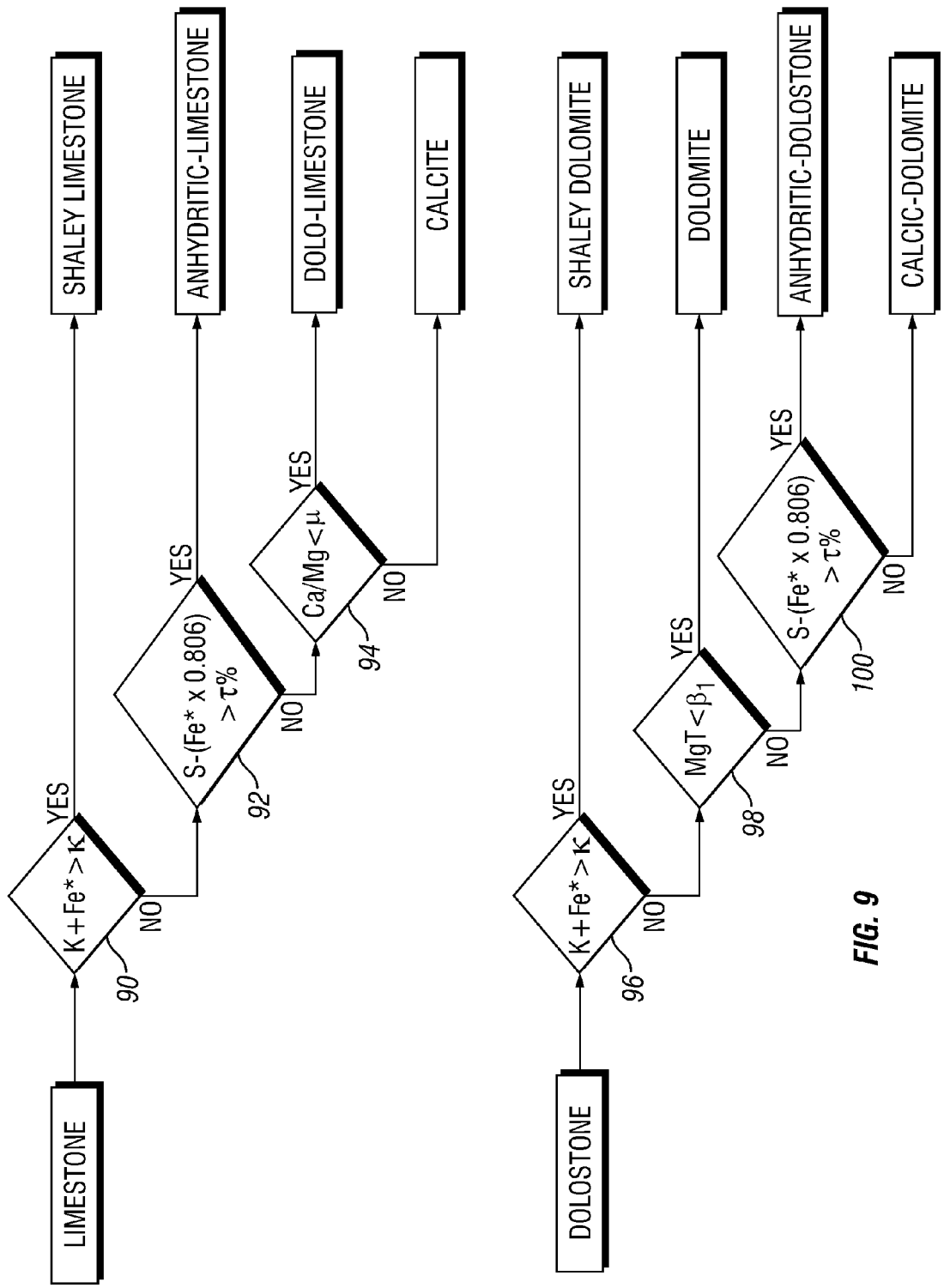
FIG. 9 illustrates a flow chart showing expert system logic to define carbonate lithologies.

FIG. 9 illustrates a flow chart showing exemplary artificial intelligence system logic (e.g., expert system logic) for determining the specific lithology for carbonates, based on the set of hybrid ternary diagrams in FIG. 8B. In the instance that the artificial intelligence system has determined that the section of the rock formation under investigation has a carbonate general lithology classification, the system first evaluates the amount of potassium oxide (K) and iron oxide (Fe*) at decision prompt 90, where the additive value of K+Fe* is based on the relative element oxides as determined by the ternary diagrams and hybrid ternary diagrams illustrated in FIGS. 8A and 8B, respectively. If the calculated amount of (K+Fe) is greater than $\kappa$ (wherein $\kappa$ ranges from about 1 to about 5), then the artificial intelligence system determines that the rock is classified as having a shaley limestone specific lithology. If, however, the system computes the value of (K+Fe*) to be less than K, then the system proceeds to decision prompt 92, wherein the percentage of sulfur relative to the amount of iron (S—Fe*×0.806) is computed and evaluated. If this value is determined to be greater than $\tau$ wt. % (wherein $\tau$ ranges from about 2 wt. % to about 7 wt. %), then the artificial intelligence system excludes other specific lithology classifications and classifies the rock as having anhydritic-limestone specific lithology. Conversely, if at decision prompt 92 the value of S—(Fe*×0.806) is computed to be less than $\tau$ Wt. %, then the artificial intelligence system proceeds to decision prompt 94, wherein the calcium oxide-to-magnesium oxide ratio (Ca/Mg) is computed and evaluated. If the evaluation of the Ca/Mg ratio is less than $\mu$ (wherein $\mu$ ranges from about 15 to about 30), then the system determines that the rock has a dolo-limestone specific lithology. If the Ca/Mg ratio is computed to be greater than $\mu$, however, then the rock is considered to have a calcite specific lithology.

Continuing to refer to FIG. 9, in the instance that the artificial intelligence system has determined that the rock formation has a general lithology classification of a dolostone, the system first evaluates the amount of potassium oxide (K) and iron oxide (Fe*) at decision prompt 96, where the additive value of (K+Fe*) is based on the relative element oxides as determined by the hybrid ternary diagrams illustrated in FIGS. 8A and 8B. If the calculated amount of (K+Fe*) is greater than $\kappa$ (wherein $\kappa$ ranges from about 1 to about 5), then the artificial intelligence system determines that the rock is classified as having a shaley dolostone specific lithology. If, however, the system computes the value of (K+Fe*) to be less than $\kappa$, then the system proceeds to decision prompt 98, wherein the magnesium oxide ternary value (MgT) is computed and evaluated. If by computation and comparison MgT is determined to be less than $\beta_1$, then the rock is classified as having a dolostone specific lithology, excluding the anhydritic- and calcic-dolostone classifications. However, in the event that the magnesium oxide ternary value is greater than $\beta_1$, the artificial intelligence system proceeds to decision prompt 100. The evaluation of the value of S—(Fe*×0.806) based on relative element oxide computations as determined from the ternary and/or hybrid ternary diagrams of FIGS. 8A and 8B determines if the dolostone has anhydritic- or calcic-dolostone specific lithology. If the value of S—(Fe*×0.806) at prompt 100 is greater than $\tau$ wt. % (wherein $\tau$ ranges from about 2 wt. % to about 6 wt. %), then the system excludes other specific lithology classifications and classifies the rock as having anhydritic-dolostone specific lithology. If the value at decision prompt 100 is calculated to be less than $\tau$, then the rock is classified as having a calcic-dolostone specific lithology.

Figure 10:
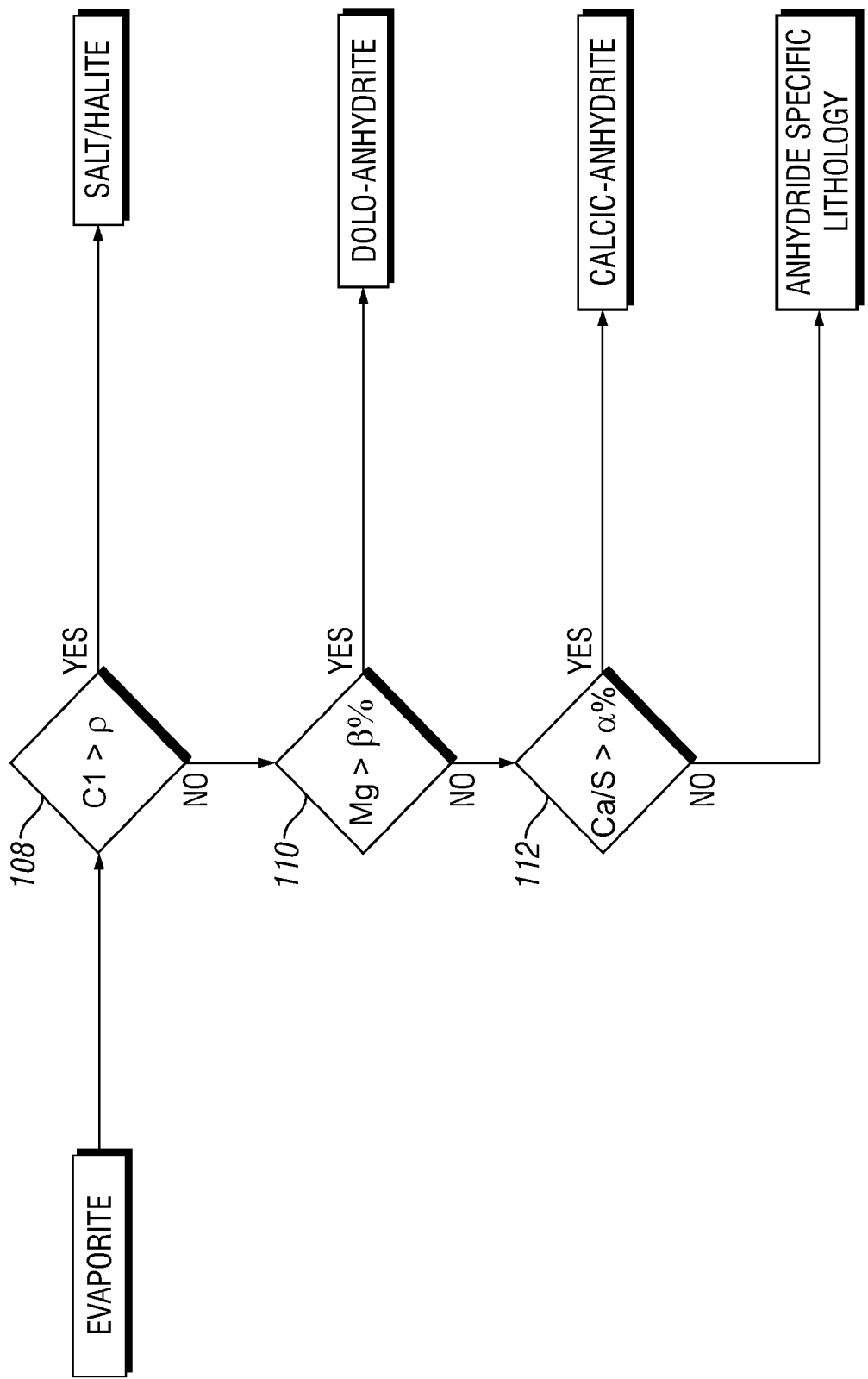
FIG. 10 illustrates a flow chart showing the use of expert system logic to define evaporate lithologies.

FIG. 10 illustrates a flow chart showing exemplary artificial intelligence system logic for determining the specific lithology for evaporites, using an expert system as an example (without limitation) of an exemplary AI system. When a section of a rock formation has been assigned a general lithology of evaporite by the artificial intelligence system and methods of the present invention, the specific lithologies of the evaporite can be readily determined with little computational effort by the system. At decision prompt 108, the artificial intelligence system evaluates the amount of chloride (Cl) present in the rock or rock formation, based upon the amount of free chloride as reported by the logging tool. If the amount of chloride is determined to be greater than $\rho$ wt. % (wherein $\rho$ ranges from about 8 wt. % to about 11 wt. %), the system then classifies the rock as having a salt (i.e., halite) specific lithology. If, however, the rock cannot be classified as a salt or halite using this determination, the system then proceeds to decision prompt 110. Based on the evaluation of the magnesium oxide (MgO) chemistry of the rock formation, as determined from one or more ternary diagrams or sets of hybrid ternary diagrams, the artificial intelligence system evaluates the amount of magnesium oxide (Mg) in the rock at decision prompt 110. If the amount of magnesium oxide (Mg) at prompt 110 is computed to be greater than $\beta$ (wherein $\beta$ ranges from about 1 wt. % to about 6 wt. %), then the artificial intelligence system classifies the rock as having a dolo-anhydrite specific lithology. However, if the amount of Mg is computed to be less than $\beta$, then the amount of calcium (based on the evaluation of the CaO chemistry of the rock formation) is evaluated at decision prompt 112, using a normalized or non-normalized calcium oxide-to-sulfur ratio (Ca/S). If the amount of calcium, based on the determinative value of the Ca/S ratio, is calculated to be greater than a (wherein a ranges from about 1.5 wt. % to about 6 wt. %, including about 2.1 wt. %), then the system assigns the rock a specific lithology of calcic-anhydrite, while if the amount of Ca, based on the calcium oxide-to-sulfur ratio, is calculated to be less than $\alpha$, then the calcic-anhydrite classification is excluded, and the artificial intelligence system assigns the rock an anhydride specific lithology.

Figure 11:
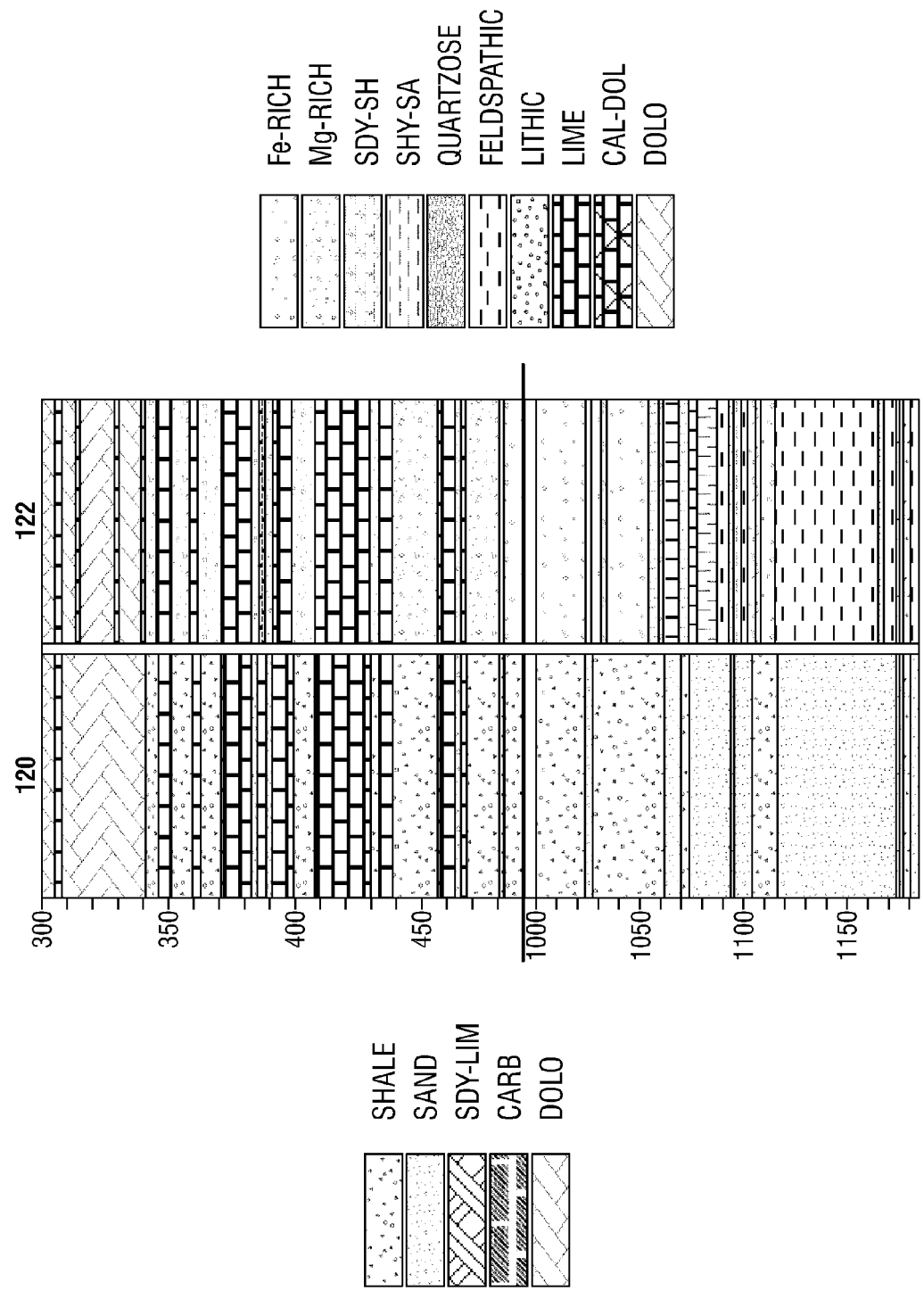
FIG. 11 illustrates a color schematic stratigraphic column for a section of a Johnson City (TX) test well formation, illustrating both the lithology and mineralogy of the stratigraphic units.

FIG. 11 illustrates one type of the several typical output forms that the lithology determination/estimation provided by the systems of the present disclosure can provide. As shown therein, for a selected section of a subterranean formation surrounding a test well-bore (Johnson City, Tex.) that has been analyzed according to methods of the present invention, a graphical representation of the general lithology of a test well is shown at stratigraphic formation column 120. Similarly, the specific lithology of the same test well, providing greater detail as to the compositions of the various general lithologies at stratigraphic formation column 120, is illustrated in stratigraphic formation column 122. For example, to further illustrate the utility of the methods and systems of the present invention, between about 1100 feet and 1180 feet, the general lithology 120 as determined using the artificial intelligence system and methods of the present invention suggests primarily a sandstone lithology, with a small bed of shale near the 1100 foot mark. However, if the expert system and methods as described herein are utilized further, much more specific lithological detail is seen in section 122 for the same subterranean region of the wellbore. More specifically, it can be readily seen that the sandstone region between 1118 feet and about 1175 feet comprises primarily feldspathic sandstone, with intermittent bands of quartzose. Additionally, the small bed of shale near the 1100 foot mark in specific lithology section 122 is shown to be not simply shale, but rather a mixture of iron-rich and magnesium-rich shale, with a lower bed of sandy shale forming a boundary between the shale lithological region and the feldspathic sandstone lithological region.

Mineralogy Determination

The next step in the interpretation process, should such information be desired to be determined, is the determination of the mineralogy from the general and specific lithology information. The lithologic classification used in the methods of the present invention, and detailed in part above, allow the analyst to place constraints on the final petrophysical solution and customize the output accordingly. For example, in accordance with the methods of the present disclosure, in the instance of a feldspathic sand specific lithology, an analyst/user may want to only know or predict feldspars and, due to possible feldspar decomposition models, the presence of illite/smectite, chlorite, and/or kaolinite within the formation region. Using the methods of the present invention, such a determination is possible.

Minerals contained in a subterranean formation that can be determined and quantified in accordance with methods of the present invention include, but are not limited to, tectosilicates and non-ferromagnesian silicate minerals, including quartz ($SiO_2$); feldspars, including both plagioclase feldspars and K-feldspars (also known as K-spars, or alkali feldspars), such as microcline; phyllosilicates, including members of the chlorite group, such as chlorite $[(Fe,Mg,Al)_6(Si,Al)_4O_{10}(OH)_8]$; and, the clays, including members of the illite/smectite group including but not limited to montmorillonite. In further aspects of the present invention, specific minerals that can be identified, and their amounts generally quantified, using the methods and systems of the present invention, include but are not limited to the following minerals, wherein the formulas are meant to be exemplary, but not inclusive: albite ($NaAlSi_3O_8$), anhydrite ($CaSO_4$), calcite (limestone, $CaCO_3$), coal (C), chlorite [$(Mg,Fe)_3(Si,Al)_4O_{10}(OH)_2 \cdot (Mg,Fe)_3(OH)_6$], dolomite ($CaMg(CO_3)_2$), glauconite [$(K,Na)(Fe^{3+},Al,Mg)_2(Si,Al)_4O_{10}(OH)_2$], halite (NaCl), hematite ($Fe_2O_3$), illite/smectite [$(K,Na,H)(Al,Mg,Fe)_2(Si,Al)_4O_{10}[(OH)_2,(H_2O)_n]$], kaolinite [$Al_2Si_2O_5(OH)_4$], K-feldspar ($KAlSi_3O_8$), (microcline ($KAlSi_3O_8$), orthoclase ($KAlSi_3O_8$)), plagioclase, pyrite ($FeS_2$), quartz ($SiO_2$), siderite ($FeCO_3$), and zeolites, including members of the analcime, harmotome, and stilbite families, chain-like zeolites (e.g., natrolite), sheet-like zeolites (e.g., laumontite and heulandite), and framework structure zeolites (e.g., chabazite); as well as polymorphs and hydrates of such minerals.

Figure 12A:
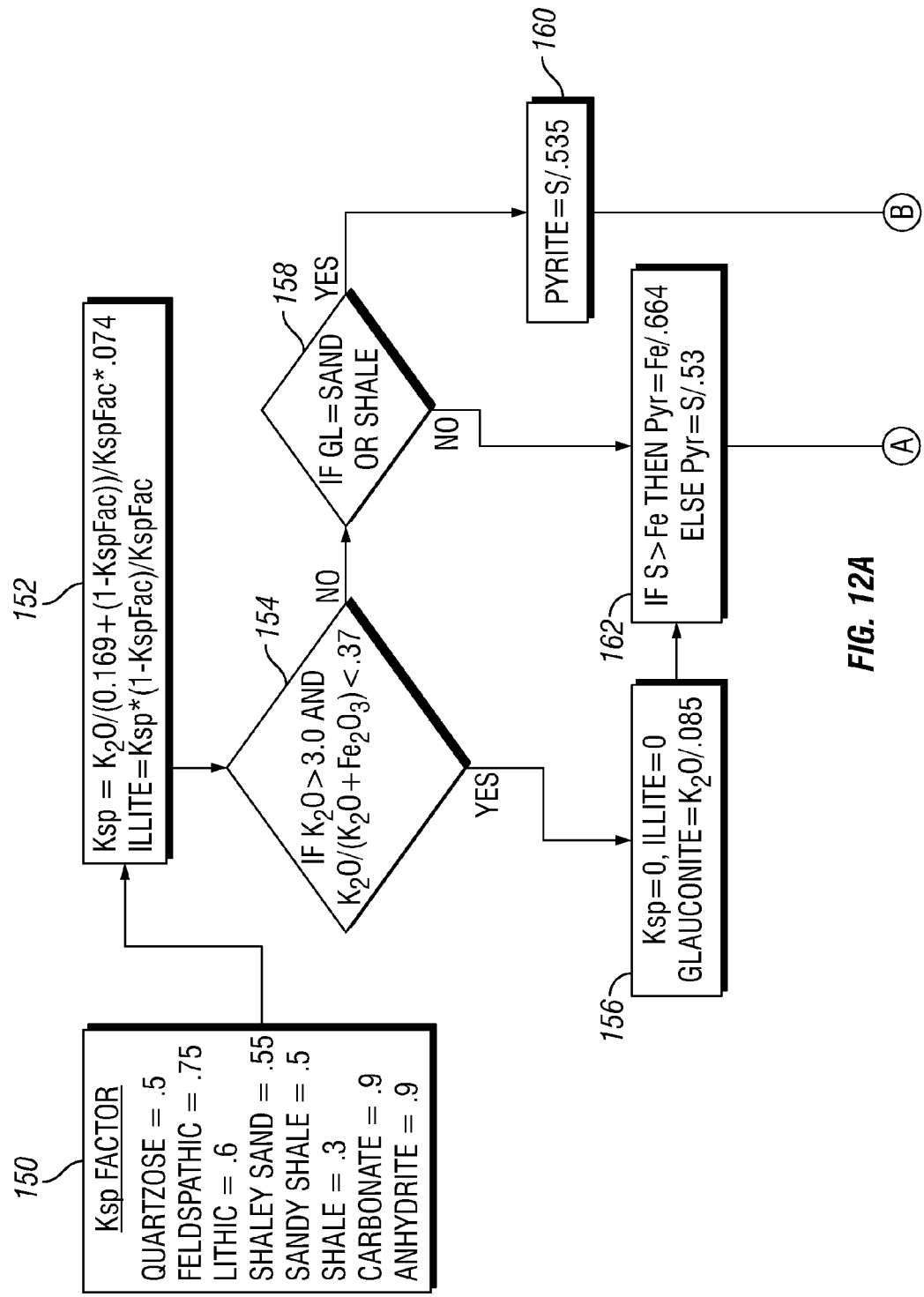
FIGS. 12A and 12B illustrate exemplary logic algorithms for the determination of mineralogy of a formation from the general and specific lithology information generated in accordance with aspects of the present disclosure.
Figure 12B:
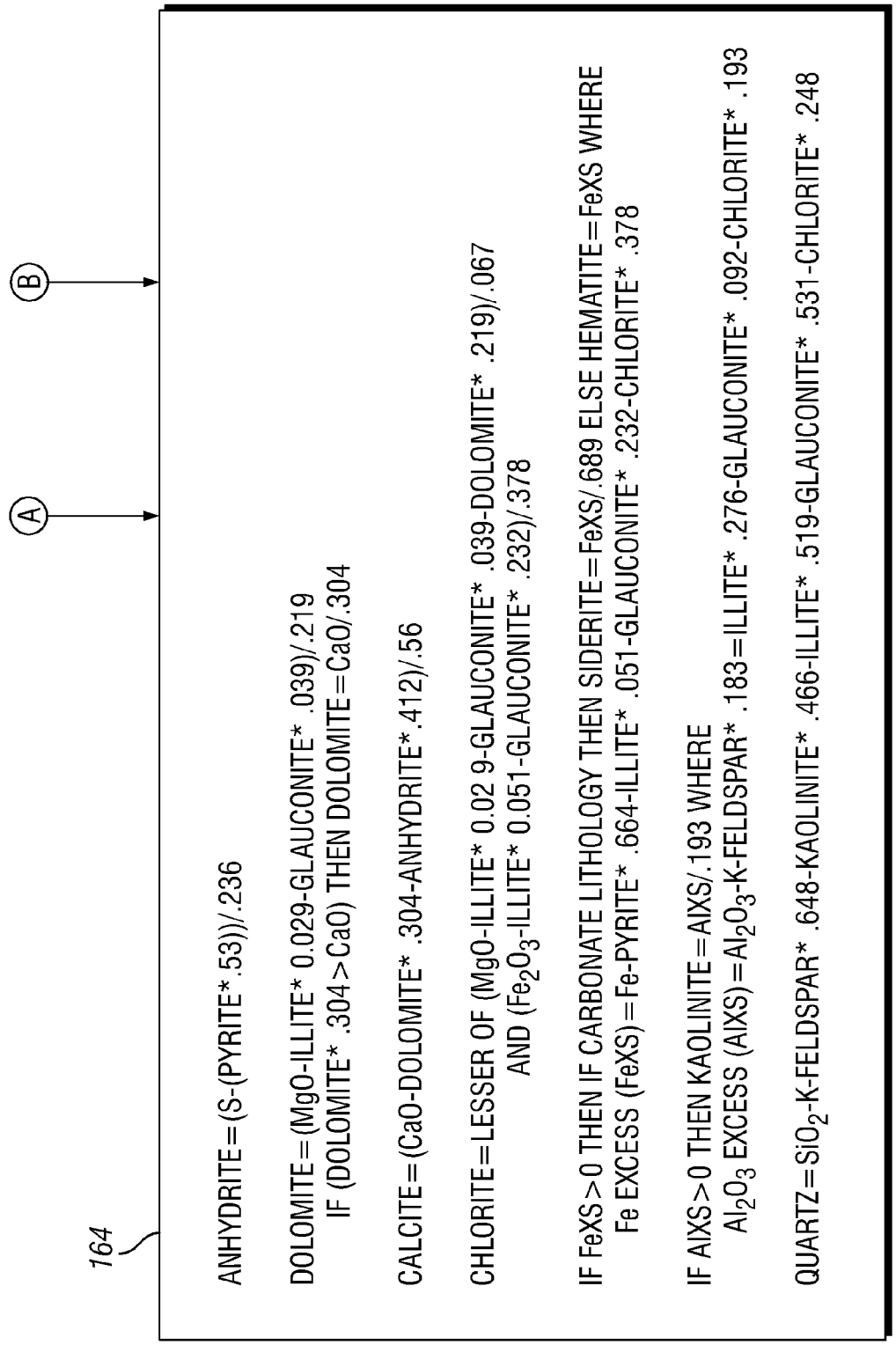

Following the determination of the general and specific lithology of a subterranean formation surrounding a wellbore, the mineralogy of the formation can also be determined using the artificial intelligence logic system and methods described herein. An exemplary logic algorithm for such mineralogy determination from the general and specific lithology information, using an artificial intelligence system (such as an expert system) 20 as described herein, is illustrated in FIG. 12. In reference to this figure, as with all of the flow diagrams and logic algorithms discussed herein, the numbers are exemplary only, and the coefficients listed in the formulas are averages of the best, general illustrative coefficients. However, it will be clear to those of skill in the art that these numbers and coefficients can be varied as appropriate, depending upon a number of factors, including the subterranean formation being logged and analyzed, and the specific output limitations desired by the user of the system.

As illustrated in FIG. 12, at process 150, an artificial intelligence system 20 may first determine and define the K-feldspar (Ksp) Factor (referred to herein as "KspFac"), based on the determination of the general and specific lithology as previously described. The KspFac values determined for the various lithologies are then used by system 20 at appropriate decision prompts to aid in the process of determining the mineralogy. Following determination of the KspFac at process 150, the system (20) may then proceed to process 152, to calculate the amount of illite based on the amount of observed $K_2O$, using the calculations illustrated. Following determination of the Ksp values and the illite determinative in process 152, the system proceeds to decision prompt 154. If the amount of observed potassium oxide ($K_2O$) is not greater than a predefined discriminator (e.g., about 3.0), and the ratio of potassium oxide-to-($K_2O+Fe_2O_3$) is not less than a predefined discriminator (e.g, about 0.37), then there must necessarily be contributing amounts of illite, and the system proceeds to decision prompt 158. If, however, these requirements at prompt 152 are met, the system proceeds to process 156, wherein the Ksp value is assigned a value of 0, illite is determined to not be present and is similarly assigned a value of 0, and the amount of glauconite is calculated as shown. From process 156, the system proceeds to process 162 to process determination 162, and then proceeds to quantify the remaining minerals as appropriate or as specifically desired, based upon the observed elemental oxides and the stoichiometry of individual minerals, using determinative algorithms such as those illustrated in process 164.

If the requirements of decision prompt 154 are not met, the system proceeds to continue the preliminary mineralogical analysis. At decision prompt 158, the general lithology (GL) is evaluated; if the general lithology (GL) is sand or shale, then the system proceeds to decision prompt 160, wherein the amount of pyrite may be determined by the appropriate calculation using the amount of elemental sulfur (S) divided by an appropriate discriminator (e.g., about 0.535). If, however, at decision prompt 158, the general lithology (GL) has not been determined to be sand or shale, then pyrite (Pyr) may be determined based on the amount of $Fe_2O_3$ (Fe) or elemental sulfur (S) at calculation process 162. Then, in a sequential fashion, as further illustrated in FIG. 12, the remaining minerals may be quantified as appropriate or as specifically desired, based upon the observed elemental oxides and the stoichiometry of individual minerals, using the determinative algorithms within process 164. The mineralogical composition data thus determined can be provided as output in the form of specific mineralogical information, or the information can be provided as mineralogical groups (i.e., clays). Exemplary outputs include stratigraphic columns illustrating mineralogy vs. depth for a specific portion of a subterranean formation surrounding an earth bore.

In accordance with further features of the present disclosure, the mineralogical information determined using an artificial intelligence system, such as an expert system or a neural net system as described herein, can be quantified using additional subterranean formation data available from a variety of sources. Suitable sources for providing such additional quantifying information include additional mineral data, such as that available from X-ray diffraction (XRD) analysis or thin section analysis of a core sample, user-specific constraints based upon the specific information being sought by the analyst regarding a specific subterranean formation, and conventional log data as described previously with regard to further quantifying the lithology determinations (e.g., NMR, GR, PE, Sonic, C/O, Caliper, spontaneous potential, and MRI-based porosity and permeability information).

The mineralogical data obtained in accordance with the methods of the present invention can also be used to determine other petrologic and petrophysical information concerning a subterranean formation surrounding a wellbore. For example, the mineralogical content and amounts can be used to determine or predict such features as porosity, grain density, and permeability characteristics of the subterranean formation.

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

EXAMPLES

Field examples illustrating exemplary methods of lithological and mineralogical analysis are described below, and in the associated and referenced figures. Core data used in the comparisons was obtained for all of the wells, and each of the wells was logged with a logging sonde, which utilizes the pulsed-neutron Formation Lithology Explorer (FLEX™) wireline logging tool (Baker Atlas, Houston, Tex.) to measure neutron capture and inelastic measurements. This logging sonde also utilizes the natural gamma ray Spectralog® II instruments (Baker Atlas, Houston, Tex.). The Spectralog® II and FLEX instruments measure formation concentrations for Ca, Si, Mg, S, C, Fe, Al, K, Ti, and Th based upon the principles of gamma ray spectroscopy. These tools were characterized based upon stationary measurements in formations located at the Instrument Characterization Center in Houston, Tex. Specifically, the measurement of Mg, Al, and C comes from an evaluation of the inelastic gamma ray energy spectrum, which is achieved through the use of an electronic, high frequency source of 14 MeV neutrons.

Figure 13:
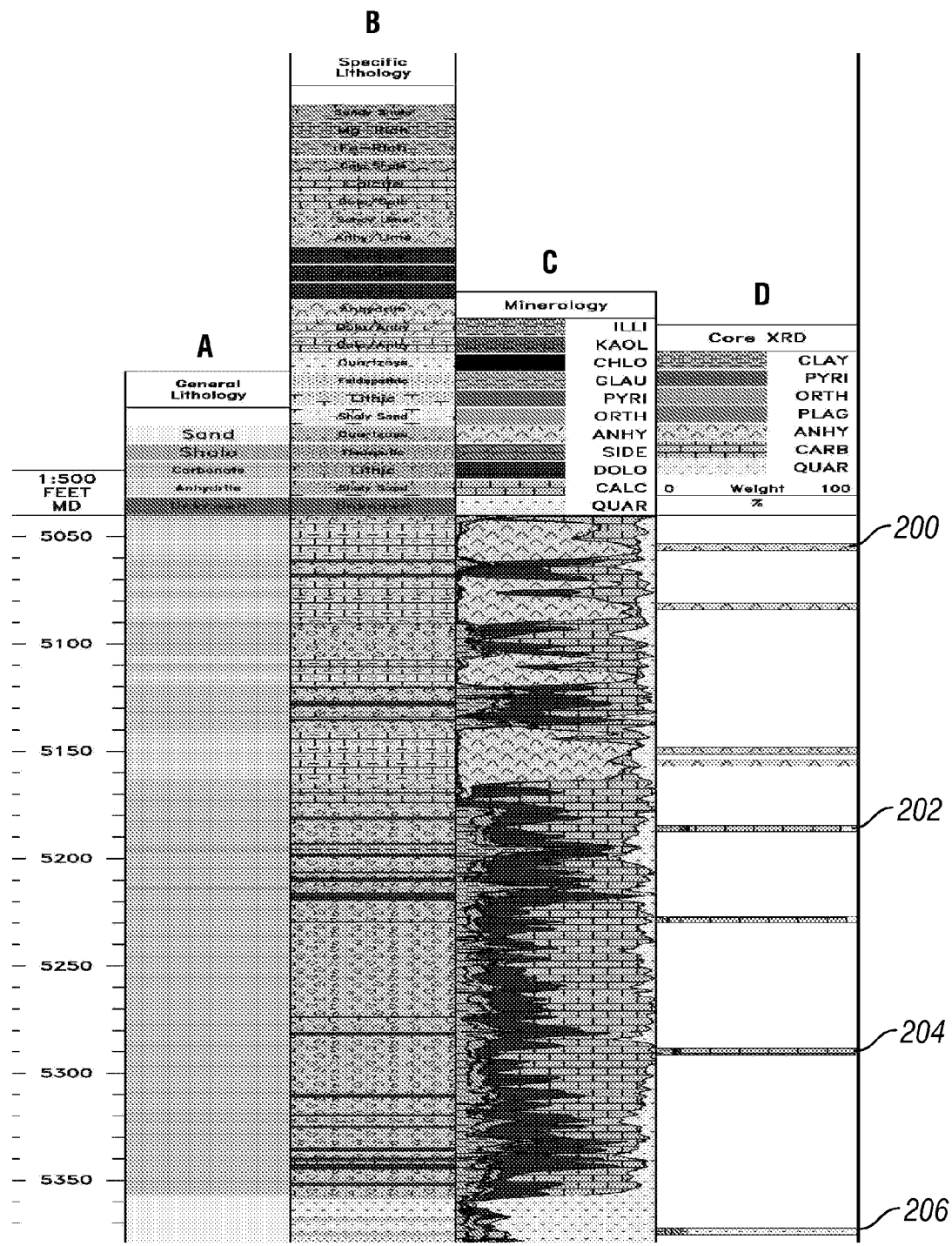
FIG. 13 illustrates a schematic stratigraphic column of the Western Louisiana test well of example 1, in comparison with X-ray diffraction data from the same well.
Figure 14:
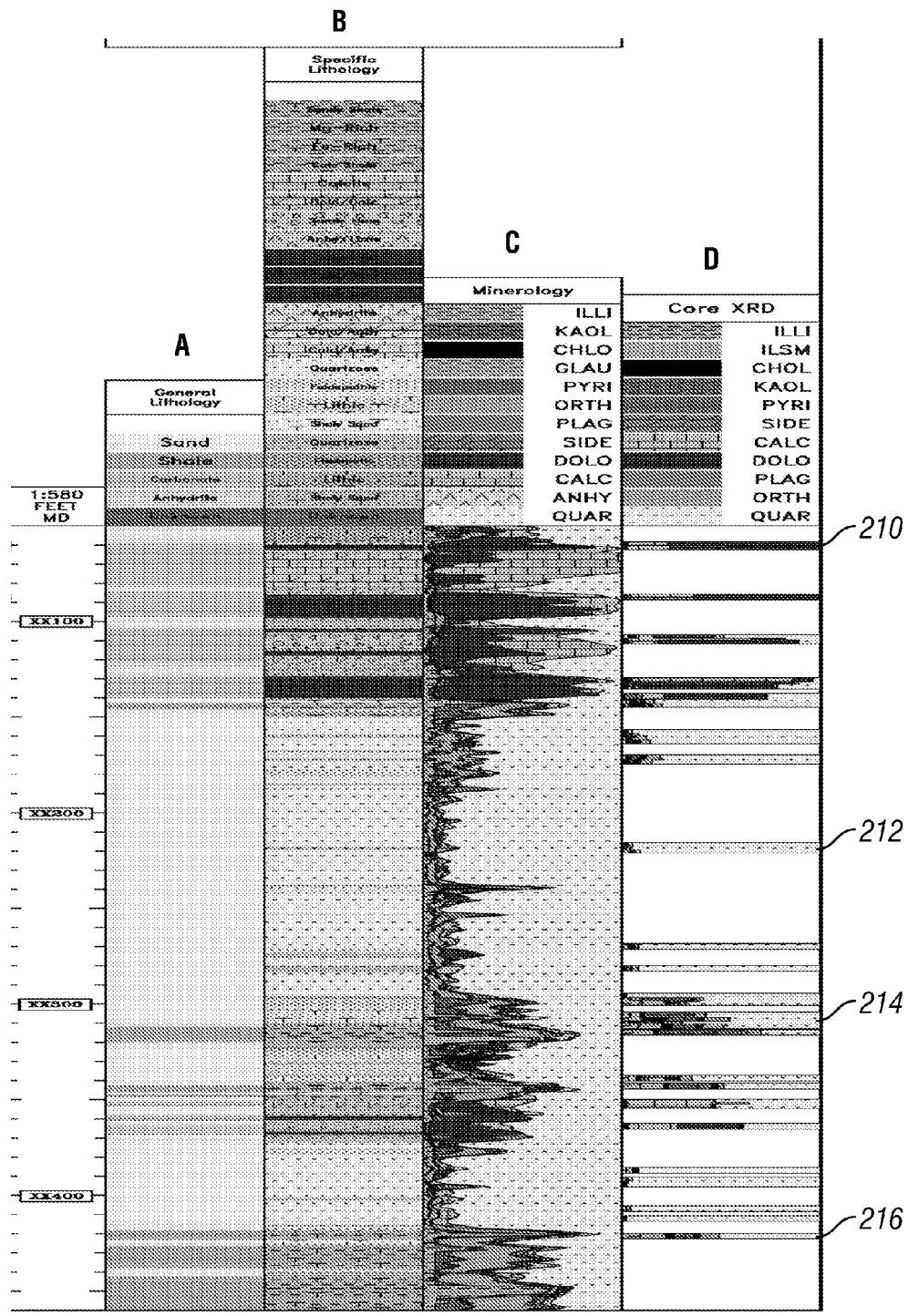
FIG. 14 illustrates a schematic stratigraphic column of the South American test well of example 2, in comparison with core X-ray diffraction data from the same well.
Figure 15:
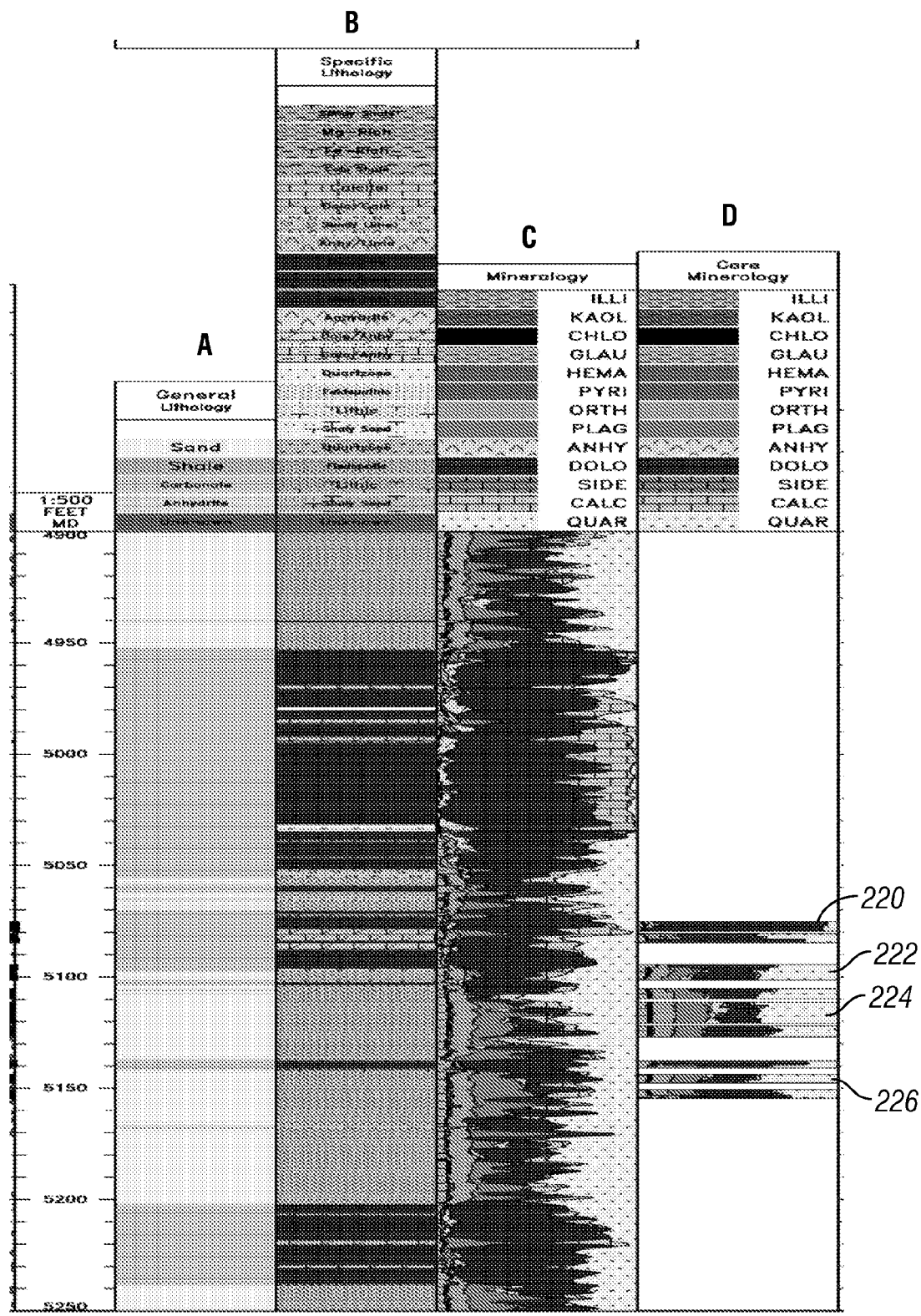
FIG. 15 illustrates a schematic stratigraphic column of the West Texas Well of example 3, in comparison with core X-ray diffraction data from the same well.

In color FIGS. 13-15, the following abbreviations, and their associated meanings are used: "anhy" refers to the mineral anhydrite; "illi" refers to the mineral illite; "ilsm" refers to illite/smectite; "kaol" refers to the mineral kaolinite; "chlo" refers to the mineral chlorite; "glau" refers to the mineral glauconite; "hema" refers to the mineral hematite; "orth" refers to the mineral orthoclase; "pyri" refers to the mineral pyrite; "side" refers to the mineral siderite; "dolo" refers to the mineral dolomite; "calc" refers to the mineral calcite; "clay" refers generally to the clay minerals, including but not limited to any one or more of the clay minerals illite, kaolinite, chlorite, and montmorillonite; and, "quar" refers to the mineral quartz.

Example 1

Analysis of a Western Louisiana Well

To evaluate the quality and potential applications of the downhole lithology and mineralogy measurements to reservoir characterization, according to the methods of the present invention, geochemical well logs using the FLEX™/Spectralog®wireline logging tool/sonde (Baker Atlas, Houston, Tex.) were obtained from a well in Western Louisiana. The results of the logs at a depth ranging from about 5050 feet to about 5400 feet below the surface, in comparison with core data analysis, are presented in the plots of FIG. 13.

As evidenced by the general lithology information presented in stratigraphic column A, the intervals in this well include carbonate, anhydrite, and some fairly clean sandstone at the lower depths. The large amounts of sulfur and calcium coupled with a lack of carbon provide clear indicators for the presence of anhydrite. As illustrated in stratigraphic column B, providing specific lithology information about the well, the carbonate is primarily limestone (sandy limestone) with some intermingled dolostone, while the anhydrite is primarily calcic anhydrite. As can be seen in the figure, results from core data analysis in column D show good agreement with the log response for the general and specific lithologies, as well as for the mineralogies. For example, band 200 in stratigraphic column D illustrates that the rock formation at this depth has a mineralogy that is almost purely anhydrite, according to the core XRD data. This correlates well with stratigraphic column C, illustrating the mineralogy at this same depth as determined by the system of the present invention, which is similarly determined to be substantially anhydrite, with minor amounts of quartzite present. Exemplary beds 202, 204, and 206 similarly illustrate good correlations between the mineralogy as determined using the methods of the present invention compared to core XRD data at the same depth. Bed 202, in both columns C and D, shows illite clay, siderite, K-feldspar, calcite and quartz present at a measured depth of about 5180 ft; bed 204, in both columns C and D, shows the composition to be primarily carbonate at a measured depth of about 5290 ft, with minor amounts of illite and siderite; and, band 206, in both columns C and D, shows the composition at a measured depth of about 5370 ft to be primarily (>80%) quartz, with trace amounts of illite, K-feldspar, plagioclase, and carbonate.

Example 2

Analysis of a South American Well

To further evaluate the quality and potential applications of the downhole lithology and mineralogy measurement methods disclosed herein to reservoir characterization, geochemical well logs using the Formation Lithology Explorer (FLEX™) wireline logging tool (Baker Atlas, Houston, Tex.) and the Spectralog® II instrument to quantify gamma-rays from neutron capture and inelastic scattering, were run in a test well in South America. These results are presented graphically in the schematic stratigraphic columns of the formation illustrated in FIG. 14. As illustrated therein in stratigraphic column A, showing the general lithology of the test section, the test well has a significant carbonate section at the top of the interval, followed by an extremely clean sand zone below, intermixed with several shale zones at the lower depths. As illustrated in stratigraphic column B, providing specific lithology information about the test well, the carbonate is a mixture of limestone (dolomitic and sandy limestone) and intermingled dolostone (including some sandy dolostone), while the sand zone is primarily quartz sand with intermingled beds of feldspathic sand, lithic sand, and quartzose. The specific lithology of column B also shows that the shale zones at the lower depths of the well are primarily iron-rich and sandy shales, as would be expected given the surrounding lithologies.

Comparison of the mineralogy vs. depth stratigraphic columns in FIG. 14 for the depth between a first measured depth (around XX50) and a second measured depth (about XX450), also illustrate an outstanding agreement between the mineralogy as determined by the systems and methods of the present invention, and core XRD data from the same well at the same depth interval. For example, the stratigraphic bed 210 in stratigraphic column C of FIG. 14, representing the determined mineralogy for the test well, shows a mineralogy of primarily dolomite with minor amounts of illite and calcite. This is in very good agreement with the mineralogy as determined by XRD analysis of a core from the same well at this depth, as shown in stratigraphic column D, which shows the mineralogy to similarly be primarily dolomite with minor amounts of calcite. Exemplary beds 212, 214, and 216 similarly illustrate good correlations between the mineralogy as determined using the methods of the present invention compared to core XRD data at the same depth. Bed 212, in both stratigraphic columns C and D, shows the rock to be primarily quartz, with minor amounts of illite/smectite and K-feldspar; bed 214, in both columns C and D, shows the composition to be about 50% quartz at this depth, with the remainder of the rock comprising illite/smectite, chlorite, K-feldspar, and notable amounts (>5%) of pyrite; and, in bed 216, both columns C and D show the composition at this depth to be about 50% quartz, with the remainder comprising primarily illite/smectite, and K-feldspar, with trace amounts of pyrite present as well.

Example 3

Analysis of a West Texas Well

In yet another example to further evaluate the quality and potential applications of the present downhole lithology and mineralogy measurement methods to reservoir characterization, geochemical well logs using a logging sonde to measure gamma rays from neutron capture and inelastic scattering were run in a test well in the Permian Basin of West Texas, which has been previously detailed petrographically by a number of individuals [see, for example, Saller, A. H., et al., *AAPG Bulletin*, v. 82(8): pp. 1528-1550 (1998), as well as references cited therein]. As illustrated in FIG. 15, the core mineralogy based on X-Ray Diffraction (XRD) displays an excellent agreement with the mineralogy as determined by the systems and methods of the present invention. Stratigraphic column A of FIG. 15, providing general lithology information of the test well between a depth of about 4900 feet (measured depth, MD) and about 5250 feet (MD), shows that the test well has a sand section at the top of the interval, followed by a significant and extremely clean carbonate zone below, with the lower depths below about 5100 feet (MD) being primarily sand zones interbedded with several carbonate zones. As illustrated in stratigraphic column B, providing specific lithology information about the test well, the sand zones are determined to be primarily feldspathic sands interbedded with quartzose. The specific lithology of column B also shows that the carbonate zones of the well are primarily dolomitic interbedded with limestone (both sandy and dolomitic limestone). Based on the lithological evaluation of this test well, very little clay is contained in this well.

Comparison of the mineralogy vs. depth stratigraphic columns for the depth between about 4900 feet (MD) and about 5250 feet (MD) also illustrates an outstanding agreement between the mineralogy as determined by the systems and methods of the present invention, in comparison with core mineralogy data from the same well at the same depth interval, as obtained using X-Ray Diffraction (XRD). For example, the stratigraphic bed 220 in stratigraphic column C of FIG. 15, representing the determined mineralogy for the test well, shows a mineralogy of primarily dolomite with minor amounts of quartz and trace amounts of illite/smectite and calcite. This is in very good agreement with the mineralogy as determined by XRD (X-Ray Diffraction) analysis of a core from the same well at this depth, as shown in stratigraphic column D, which shows the mineralogy at bed region 220 to similarly be primarily dolomite with minor amounts of quartz and trace amounts of illite/smectite. Exemplary beds 222, 224, and 226 similarly illustrate good correlation between the mineralogy as determined using the methods of the present invention displayed in stratigraphic column C compared to the core XRD data at the same depths presented in stratigraphic column D. Bed 222, in both columns C and D, shows the rock to be a roughly equal mixture of dolomite and quartz, with the remainder of the rock comprising minor amounts of K-feldspar and plagioclase, and trace amounts of illite/smectite; bed 224, in both columns C and D, shows the composition to be significantly quartz at this depth, with the remainder of the rock comprising dolomite, anhydrite, K-feldspar, and plagioclase, as well as trace amounts of illite/smectite; and, in bed 226, both columns C and D show the composition at this depth to be about 40% quartz, with the remainder comprising dolomite, K-feldspar, and plagioclase, with trace amounts of illite/smectite, calcite, and anhydrite also present.

The various steps described or claimed herein can be combined with other steps, can occur in a variety of sequences unless otherwise specifically limited, various steps can be interlineated with the stated steps, and the stated steps can be split into multiple steps. Unless the context requires otherwise, the word "comprise" or variations such as "comprises" or "comprising", should be understood to imply the inclusion of at least the stated element or step or group of elements or steps or equivalents thereof, and not the exclusion of any other element or step or group of elements or steps or equivalents thereof. Also, any directions such as "top," "bottom," "left," "right," "upper," "lower," and other directions and orientations are described herein for clarity in reference to the figures and are not to be limiting of the actual device or system or use of the device or system. The device or system may be used in a number of directions and orientations.

The invention has been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intends to protect all such modifications and improvements to the full extent that such falls within the scope or range of equivalent of the following claims.

What is claimed is:

1. A method for estimating the lithology and mineralogy of a formation surrounding a borehole, the method comprising:
   traversing the borehole with a well logging system on a logging tool string connected to surface equipment, the system including a computer and a processor coupled to one or more electromagnetic radiation systems or sources;
   obtaining wellbore data from the formation with the well logging system;
   sending the wellbore data to the processor;
   generating a lithology compositional model by a process that includes converting the wellbore data to elemental data as major element oxides and then generating ternary diagrams from the elemental data; and
   generating a complete quantitative mineralogy of the formation based on the lithology compositional model that has been generated,
   wherein the generation of the compositional model and the quantitative mineralogy is done by the processor using data that is obtained from the well logging system.

2. The method of claim 1, wherein the well logging system comprises a neutron source.

3. The method of claim 2, wherein the neutron source is a pulsed neutron source.

4. The method of claim 1, wherein the borehole is a cased hole.

5. The method of claim 1, wherein the wellbore data obtained comprises elemental concentration per unit weight data.

6. The method of claim 1, wherein the well logging system further comprises a gamma ray detector.

7. The method of claim 6, wherein the gamma ray detector is capable of measuring capture gamma radiation, inelastic gamma radiation, natural gamma radiation, and combinations thereof.

8. The method of claim 1, wherein the generation of the compositional models is performed by an artificial intelligence system.

9. The method of claim 8, wherein the artificial intelligence system is selected from the group consisting of expert systems, neural networks, genetic algorithm-based systems, fuzzy logic systems, look-up tables, cluster analysis systems, and combinations thereof.

10. The method of claim 1, wherein the generation of the lithology compositional model further comprises the generation of a general lithology compositional model.

11. The method of claim 10, wherein the general lithology compositional model comprises information on the individual chemical elements and combinations thereof of in sands, shales, carbonates, evaporites, and coal, such that the elemental chemistry information only is used to determine the general lithology compositional model.

12. The method of claim 1, wherein the generation of the lithology compositional model further comprises the generation of a specific lithology compositional model.

13. The method of claim 12, wherein the specific lithology compositional model comprises information on the individual chemical elements and combinations thereof of quartzose, feldspathic sand, lithic sand, shaley sand, limey quartzose, limey feldspathic sand, limey shaley sand, iron-rich shale, magnesium-rich shale, anhydrite, dolomitic anhydrite, calcic anhydrite, calcite, and/or dolomitic calcite, such that the elemental chemistry information is used to determine the specific lithology compositional model.

14. The method of claim 1, wherein the quantitative mineralogy comprises information on the individual chemical elements and combinations thereof of minerals including but not limited to quartz, K-feldspar, albite, calcite, dolomite, siderite, anhydrite, illite, smectite, chlorite, kaolinite, glauconite, pyrite, hematite, halite, zeolites, and coal.

15. The method of claim 1, further comprising obtaining additional wellbore data about the formation using secondary well logging data sources located on the logging tool string.

16. The method of claim 15, wherein the secondary well logging data is obtained from sources comprising NMR logging data, bulk density data, resistivity data, sonic or acoustic data, neutron porosity data, photo-electric cross-section data, high definition induction log data, bulk density correction data, spectral gamma ray data, differential caliper data, core data, spontaneous potential logging data, and combinations thereof.

17. A method for estimating the lithology and mineralogy of a formation surrounding a borehole, the method comprising:
   traversing the borehole with a well logging system on a logging tool string connected to surface equipment, the system including a computer and a processor coupled to one or more electromagnetic radiation systems or sources;
   obtaining wellbore data from the formation with the well logging system on the tool string;
   sending the wellbore data to the processor;
   generating a general lithology compositional model by a process that includes converting the wellbore data to elemental data as major element oxides and then generating ternary diagrams from the elemental data; and
   generating a quantitative mineralogy of the formation,
   wherein the quantitative mineralogy is not generated prior to the generation of the general lithology compositional model, and
   wherein the generation of the compositional models and the quantitative mineralogy is done by the processor using data that is obtained from the well logging system.

18. The method of claim 17, wherein the well logging system comprises a neutron source.

19. The method of claim 18, wherein the well logging system further comprises a gamma ray detector.

20. The method of claim 19, wherein the gamma ray detector is capable of measuring capture gamma radiation, inelastic gamma radiation, natural gamma radiation, and combinations thereof.

21. The method of claim 19, wherein the generation of the compositional models is performed by an artificial intelligence system.

22. The method of claim 21, wherein the artificial intelligence system is selected from the group consisting of expert systems, neural networks, genetic algorithm-based systems, fuzzy logic systems, look-up tables, cluster analysis systems, and combinations thereof.

23. The method of claim 18, further comprising obtaining additional wellbore data about the formation using secondary well logging data sources located on the logging tool string.

24. The method of claim 23, wherein the secondary well logging data is obtained from sources comprising NMR logging data, bulk density data, resistivity data, sonic or acoustic data, compensated neutron porosity data, photo-electric cross-section data, high definition induction log data, bulk density correction data, spectral gamma ray data, differential caliper data, core data, spontaneous potential logging data, and combinations thereof.

25. The method of claim 17, wherein the borehole is an at least partially cased borehole.

26. The method of claim 17, wherein the general lithology compositional model comprises information on the individual chemical elements and combinations thereof of sands, shales, carbonates, evaporites, and coal, such that the elemental chemistry information only is used to determine the general lithology compositional model.

27. The method of claim 26, further comprising the generation of a specific lithology compositional model.

28. The method of claim 27, wherein the specific lithology compositional model comprises information on the individual chemical elements and combinations thereof of quartzose, feldspathic sand, lithic sand, shaley sand, limey quartzose, limey feldspathic sand, limey shaley sand, iron-rich shale, magnesium-rich shale, anhydrite, dolomitic anhydrite, calcic anhydrite, calcite, and/or dolomitic calcite, such that the elemental chemistry information is used to determine the specific lithology compositional model.

29. The method of claim 17, wherein the quantitative mineralogy comprises information on the individual chemical elements and combinations thereof of minerals including but not limited to quartz, K-feldspar, albite, calcite, dolomite, siderite, anhydrite, illite, smectite, chlorite, kaolinite, glauconite, pyrite, hematite, halite, zeolites, and coal.

30. An apparatus for making measurements of the lithology and mineralogy of an earth formation surrounding a borehole, the apparatus comprising:
   (a) an electromagnetic radiation system which irradiates the earth formation surrounding at least a portion of the borehole and measures received radiation, the electromagnetic radiation system including at least one of:
      (i) a neutron source and a neutron detector; and
      (ii) a gamma-ray source and a gamma-ray detector; and
   (b) a data processing system connected to the electromagnetic radiation system, the data processing system including a computer and a processor coupled to the electromagnetic radiation system,
   wherein the processor comprises an artificial intelligence system that generates a lithology compositional model and a quantitative mineralogy of the formation based on the data received from the neutron detector or the gamma-ray detector, and
   wherein the lithology compositional model is generated before the quantitative mineralogy is generated, the lithology compositional model being generated by a process that includes converting the data received from the neutron detector or the gamma-ray detector to elemental data as major element oxides and then generating ternary diagrams from the elemental data using the artificial intelligence system.

31. The apparatus of claim 30, wherein the neutron source is a pulsed neutron source.

32. The apparatus of claim 30, wherein the gamma-ray detector receives capture gamma radiation, inelastic gamma radiation, natural gamma radiation, or combinations thereof.

33. The apparatus of claim 30, wherein the artificial intelligence system is selected from the group consisting of expert systems, neural networks, genetic algorithm-based systems, fuzzy logic systems, look-up tables, cluster analysis systems, or combinations thereof.

34. The apparatus of claim 30, wherein the processor generates the lithology compositional model before it generates the quantitative mineralogy.

35. The apparatus of claim 34, wherein the lithology compositional model comprises a general lithology compositional model, a specific lithology compositional model, or both a general lithology compositional model and a specific lithology compositional model.

36. The apparatus of claim 30, wherein the electromagnetic radiation system is capable of being directed into the borehole, the borehole being at least a partially cased borehole.

37. A method for estimating the lithology and mineralogy of a formation surrounding a borehole, the method comprising:

traversing the borehole with a well logging system on a logging tool string connected to surface equipment, the system including a computer and a processor coupled to one or more electromagnetic radiation systems or sources;

obtaining wellbore data from the formation with the well logging system;

sending the wellbore data to the processor;

generating a general lithology compositional model;

generating a specific lithology compositional model; and generating a quantitative mineralogy of the formation surrounding the borehole based on the general lithology, specific lithology, or both lithology compositional models that have been generated, wherein the quantitative mineralogy is not generated prior to the generation of the specific lithology compositional model, and wherein the generation of the compositional models is done by the processor using data record that is obtained from the well logging system by a process that includes converting the wellbore data to elemental data as major element oxides and then generating ternary diagrams from the elemental data.

* * * * *